US009322306B2

(12) United States Patent
Erwin et al.

(10) Patent No.: US 9,322,306 B2
(45) Date of Patent: Apr. 26, 2016

(54) TRANSMISSION FLUID EXCHANGE MACHINE

(71) Applicant: BG INTELLECTUALS, INC., Wichita, KS (US)

(72) Inventors: Michael J. Erwin, Augusta, KS (US); Harold E. Erwin, Augusta, KS (US)

(73) Assignee: BG INTELLECTUAL, INC., Wichita, KS (US)

( * ) Notice: Subject to any disclaimer, the term of this patent is extended or adjusted under 35 U.S.C. 154(b) by 315 days.

(21) Appl. No.: 13/870,665

(22) Filed: Apr. 25, 2013

(65) Prior Publication Data

US 2013/0287593 A1   Oct. 31, 2013

Related U.S. Application Data

(60) Provisional application No. 61/638,121, filed on Apr. 25, 2012.

(51) Int. Cl.
| | |
|---|---|
| *F01M 11/04* | (2006.01) |
| *F04B 49/06* | (2006.01) |
| *F16H 57/04* | (2010.01) |
| *F04B 41/02* | (2006.01) |
| *F04B 23/02* | (2006.01) |

(52) U.S. Cl.
CPC ......... *F01M 11/0458* (2013.01); *F01M 11/045* (2013.01); *F04B 23/02* (2013.01); *F04B 41/02* (2013.01); *F04B 49/065* (2013.01); *F16H 57/0408* (2013.01)

(58) Field of Classification Search
CPC . F01M 11/04; F01M 11/045; F01M 11/0458; F16H 57/0408; B60S 5/00
USPC .......... 141/65, 98, 59, 94, 18, 2, 67, 83, 231, 141/1; 184/1.5, 6.28
See application file for complete search history.

(56) References Cited

U.S. PATENT DOCUMENTS

| | | | | |
|---|---|---|---|---|
| 4,095,673 | A | * | 6/1978 | Takeuchi ........................ 184/1.5 |
| 5,370,160 | A | * | 12/1994 | Parker .............................. 141/98 |
| 5,447,184 | A | | 9/1995 | Betancourt et al. |
| 5,626,170 | A | | 5/1997 | Parker et al. |
| 5,743,357 | A | | 4/1998 | Few et al. |
| 6,134,896 | A | * | 10/2000 | Brown et al. ................... 62/149 |

(Continued)

OTHER PUBLICATIONS

MotorVac Technologies, Motorvac TransTech III MTT 1100 flyer, updated, © 2009, two pages.

*Primary Examiner* — Timothy L Maust
*Assistant Examiner* — Timothy P Kelly
(74) *Attorney, Agent, or Firm* — Shook, Hardy & Bacon L.L.P.

(57) ABSTRACT

A machine for replacing used transmission fluid in a vehicle with new transmission fluid includes a frame having a housing. The machine includes a pair of service hoses that extend from the machine and connect to the vehicle's transmission fluid system for placing the machine in the fluid flow. A new fluid tank and a used fluid tank are provided. A pump and a manifold are associated with each of the tanks. The pumps provide for the selective withdraw or insertion of fluid into or out of the tanks. A display on the housing presents an operator of the machine with various tasks or options the machine can perform. A processor controls activation of the pumps and other electrical components based on inputs received by the display. Scales are provided under each tank for determining the amount of fluid going into and out of the tanks during the exchange process.

19 Claims, 28 Drawing Sheets

(56) References Cited

U.S. PATENT DOCUMENTS

| | | | |
|---|---|---|---|
| 6,382,271 B1 * | 5/2002 | Betancourt et al. | 141/98 |
| 6,684,714 B2 | 2/2004 | Mills et al. | |
| 6,722,397 B2 | 4/2004 | Few | |
| 6,722,398 B2 | 4/2004 | Few | |
| 6,729,364 B2 | 5/2004 | Few et al. | |
| 6,772,802 B2 | 8/2004 | Few | |
| 6,779,633 B2 | 8/2004 | Viken | |
| 6,830,082 B2 | 12/2004 | Few | |
| 6,877,531 B2 | 4/2005 | Few | |
| 6,886,606 B2 | 5/2005 | Few | |
| 6,959,740 B2 | 11/2005 | Few | |
| 6,986,283 B2 | 1/2006 | Mills et al. | |
| 8,104,522 B2 | 1/2012 | Flournoy | |
| 2005/0098226 A1 | 5/2005 | Rounds et al. | |
| 2010/0154927 A1 | 6/2010 | Flournoy | |
| 2011/0194953 A1 * | 8/2011 | Schalk et al. | 417/313 |
| 2013/0213523 A1 * | 8/2013 | Allen et al. | 141/98 |

\* cited by examiner

ADJUSTING LEVELS

PXT™ IS ADJUSTING THE LEVEL
IN THE TRANSMISSION FOR A
PROPER SERVICE.

6

LEFT TO ADJUST

*FIG. 24.*

ADDING QUICK CLEAN™

PUMP WILL AUTOMATICALLY
SHUT OFF IN
0.8 SECONDS.

—158

FUNNEL IS EMPTY

*FIG. 25.*

SERVICE COMPLETE

DISCONNECT PXT FLUID LINES AND FITTINGS FROM VEHICLE AND RECONNECT VEHICLE COOLER LINES.

CHECK FOR LEAKS AFTER STARTING VEHICLE.

DISCONNECT POWER CORD FROM BATTER AND EMPTY USED FLUID AT THE DUMPING STATION.

PRESS "NEXT" TO GO TO THE HOME SCREEN.

 BACK  NEXT   — 170

FIG. 32.

INSTRUCTIONS

THE PXT™ IS DESIGNED TO GUIDE YOU THROUGH EVER STEP TO PROVIDE THE MOST ACCURATE AND COMPLETE FLUID EXCHANGE POSSIBLE.

ANSWER EACH QUESTION AFTER YOU HAVE COMPLETED THE PROMPTED ACTION OR SELECTED THE APPROPRIATE RESPONSE THEN PRESS "NEXT" ON THE LOWER-RIGHT.

 BACK   -- PAGE 1 --    NEXT   — 170

FIG. 33.

INSTRUCTIONS

USE THE MACHINE TO EMPTY THE USED TANK
AFTER EVERY SERVICE TO KEEP THE LINES FULL.

TO ADD NEW ATF FILL THE JUG THROUGH THE
FUNNEL IN THE TOP MARKED "NEW ATF".

 BACK  -- PAGE 4 --   NEXT ⟶ 170

FIG. 36.

INSTRUCTIONS

ONCE A SERVICE HAS BEGUN THE MACHINE
SHOULD NOT BE MOVED OR BUMPED AS THIS WILL
CAUSE THE MACHINE TO READ THE SCALES
IMPROPERLY.

IF THE MACHINE IS BUMPED OR MOVED, YOU WILL
NEED TO VERIFY THE ACCURACY OF THE
EXCHANGE BY CHECKING THE TRANSMISSION
LEVEL, AND ADD/REMOVE ATF AS NECESSARY.

 BACK  -- PAGE 5 --   NEXT ⟶ 170

FIG. 37.

TRANSMISSION FLUID EXCHANGE MACHINE

CROSS-REFERENCE TO RELATED APPLICATIONS

This application claims the benefit of and priority to commonly owned U.S. Provisional Application Ser. No. 61/638,121, filed Apr. 25, 2012, which is hereby incorporated by reference in its entirety.

STATEMENT REGARDING FEDERALLY SPONSORED RESEARCH OR DEVELOPMENT

Not applicable.

TECHNICAL FIELD

The present invention relates generally to an apparatus for removing used transmission fluid from an automobile and replacing the same with new automatic transmission fluid ("ATF").

BACKGROUND

As readily understood in the art, automobiles have a transmission fluid in the transmission to reduce the wear between mechanical parts of the transmission. The fluid must be cooled during operation of the vehicle and, accordingly, the transmission fluid sub-system includes a pump which circulates the transmission fluid through the transmission and to and from a radiator via hoses such that the radiator can cool the transmission fluid and return cooled fluid back through the transmission. During the course of operation of the vehicle, the transmission fluid can break down and/or get dirty. The makeup of the transmission system does not lend itself to simply removing a drain plug and draining out used transmission and replacing it with new transmission through a dip stick or fill tube, like with oil changes. Consequently, it is known to insert a fluid exchange machine into the transmission sub-system by disconnecting one of the hoses to or from the radiator and inserting the transmission fluid exchange machine into the system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views:

FIGS. 16-47 are drawings illustrating sample user interfaces displayed on a display of the machine for operating the machine of FIG. 1 to perform various tasks.

DETAILED DESCRIPTION

Figure 1:
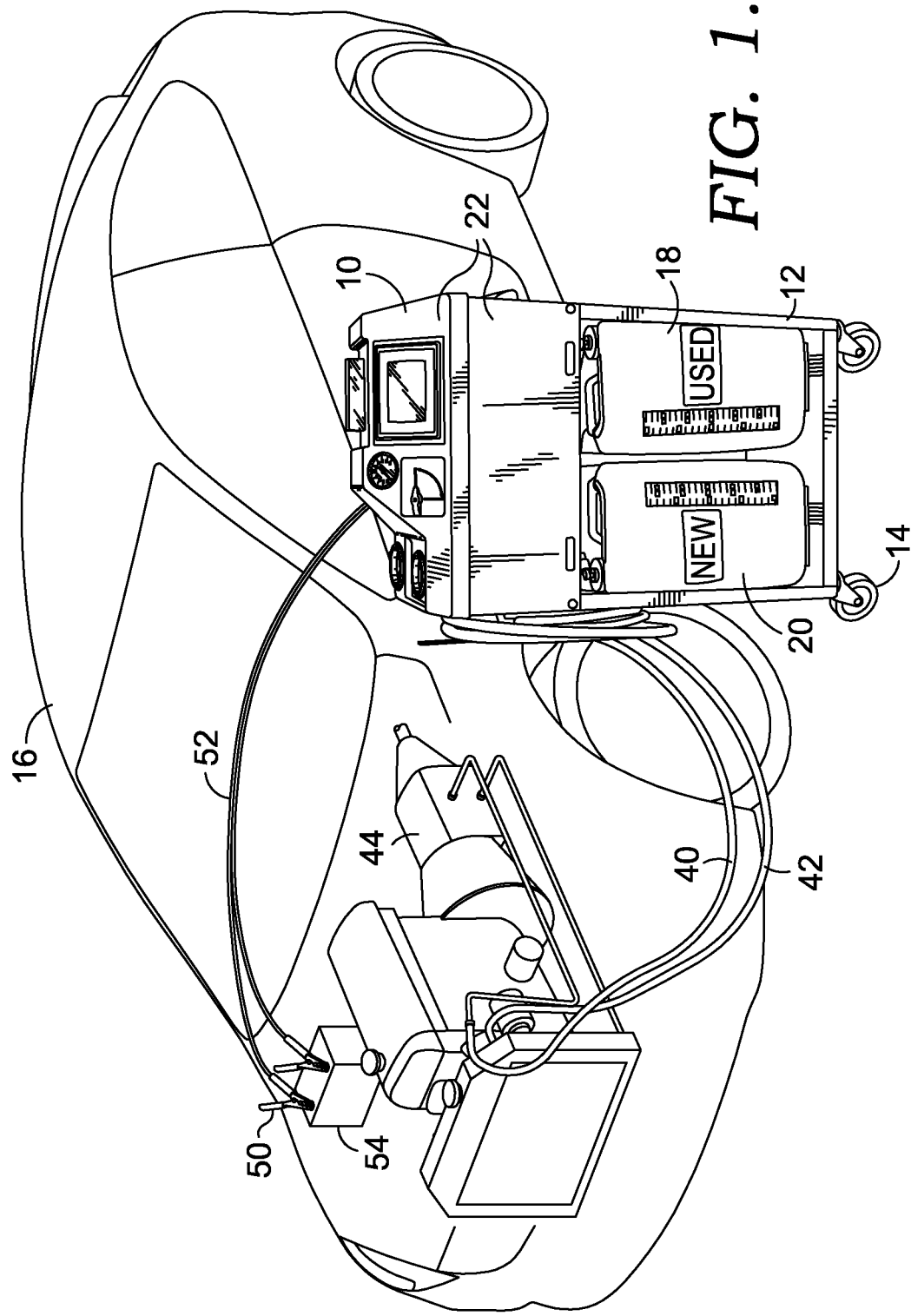
FIG. 1 is a perspective view of an embodiment of a transmission fluid exchange machine of the present invention hooked to an automobile to perform an exchange service.
Figure 2:
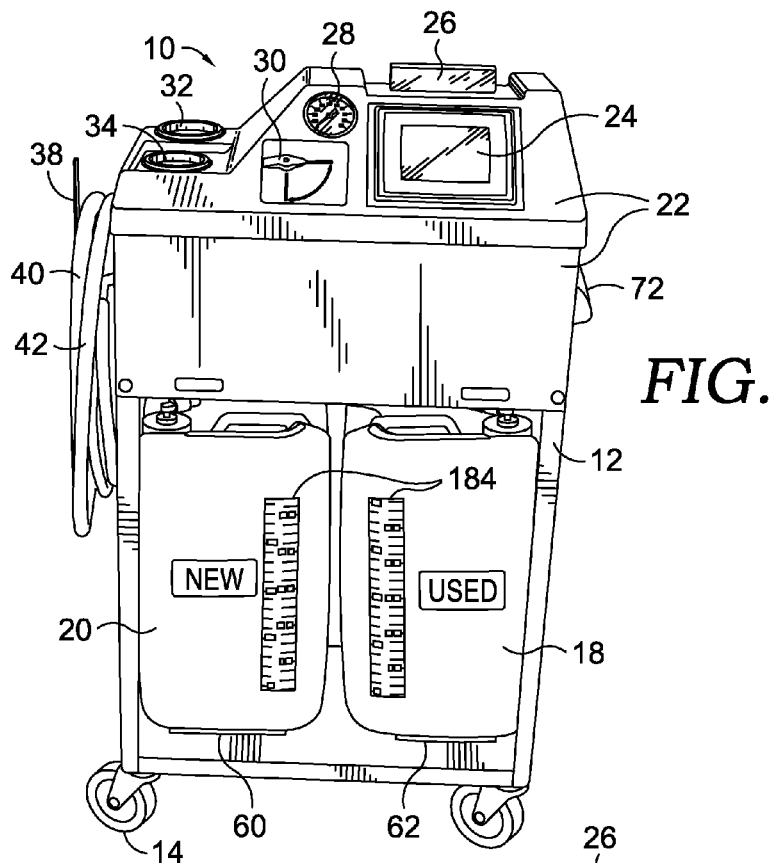
FIG. 2 is a front perspective view of the machine of FIG. 1.

Referring now to the drawings in more detail and initially to FIG. 1, numeral 10 generally designates a transmission fluid exchange machine constructed in accordance with an embodiment of the present invention. The machine 10 includes a cart-like frame 12 that sits on casters 14 to enable an operator to roll the machine 10 to a vehicle 16 to be serviced. Sitting in the frame 12 are two fluid tanks 18, 20 of preferably comparable size. One of the tanks 18 will store the removed, used automatic transmission fluid, while the other tank 20 will store new automatic transmission fluid. Above the tanks 18, 20, the frame 12 includes a housing 22 that conceals various components of the machine 10, which will be discussed in greater detail below. On the exterior of the housing 22, as seen in FIG. 2, there is a display 24, a sight glass or tube 26, a pressure gauge 28, a valve control lever 30, and a pair of funnels 32, 34. On the left side 36 of the housing 22 are hooks 38 which hold two hoses 40, 42 that connect to the vehicles' transmission system 44 to bring fluid into the machine 10 and send fluid back out of the machine 10.

Figure 3:
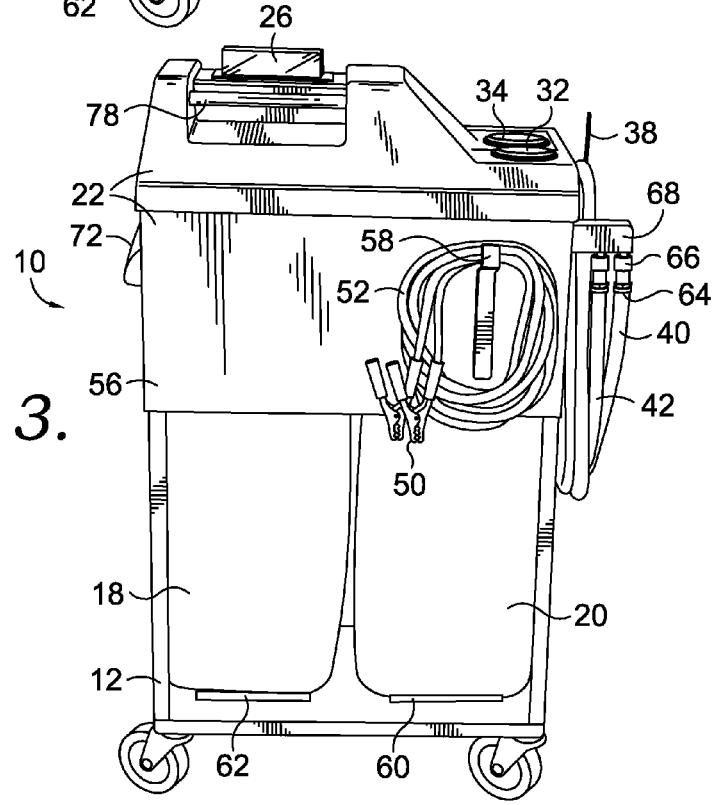
FIG. 3 is a rear perspective view of the machine of FIG. 1.

FIG. 3 shows a rear view of the machine 10. In addition to electronics that drive the display 24, the machine 10 also has a pair of pumps 46, 48 which will be discussed in greater detail below. The pumps 46, 48 and the display 24 are powered by connecting the machine 10 to the vehicle's electrical system by way of a pair of clamps 50 that connect via cables 52 to the battery 54 of the vehicle 16. The cables 52 and clamps 50 are visible on a rear 56 of the machine 10, where they are held by a bracket 58.

This particular machine 10, in order to keep a balance between the amount of fluid removed and the amount of fluid replaced, uses a pair of scales 60, 62 to determine the weights of the two tanks 18, 20 during the fluid exchange process. The scales 60, 62 are positioned underneath the tanks 18, 20 and are viewable below the tanks 18, 20 in FIG. 3. Also visible in FIG. 3 is a location where free ends 64 of the two fluid hoses 40, 42 can connect to the machine 10 via quick couplings 66 on an underneath side of a hose bracket 68 projecting from the left side 36 of the machine 10 (see also FIG. 5). While the present embodiment uses scales 60, 62 to determine the volumes of the two tanks 18, 20, alternate methods of determining the volume can be used. For example, optical sensors (not shown) may be placed on an underneath side of the housing to look down into the tanks 18, 20. Signals can be sent down and reflected off of an upper surface of the fluids to determine the fluid level. The distance the signals travel can tell where the fluid level is in each of the tanks 18, 20, which can be used to calculate the volume of fluid in each of the tanks 18, 20.

Figure 4:
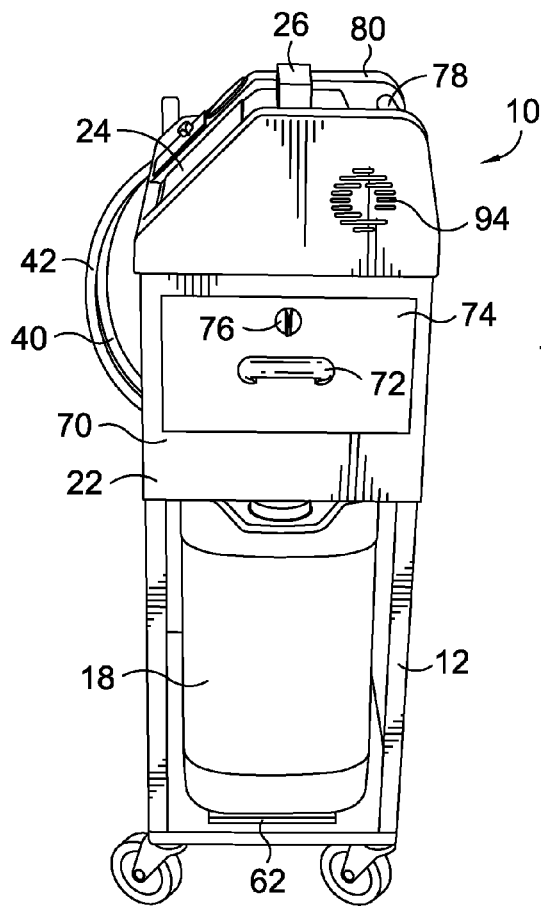
FIG. 4 is a right side perspective view of the machine of FIG. 1.

FIG. 4 discloses a view of a right side 70 of the machine 10. A drawer handle 72 extends outwardly from a drawer 74 in the right side 70 of the housing 22. The drawer provides storage for items related to the machine 10, such as manuals and parts. The drawer handle 72 also permits an operator to pull the machine 10 around to various vehicles 16 when the drawer 74 is locked in a closed position by a latch 76. Another or upper handle 78 is partially visible adjacent an upper surface 80 of the housing 22, but is more readily visible in FIG. 3.

Figure 5:
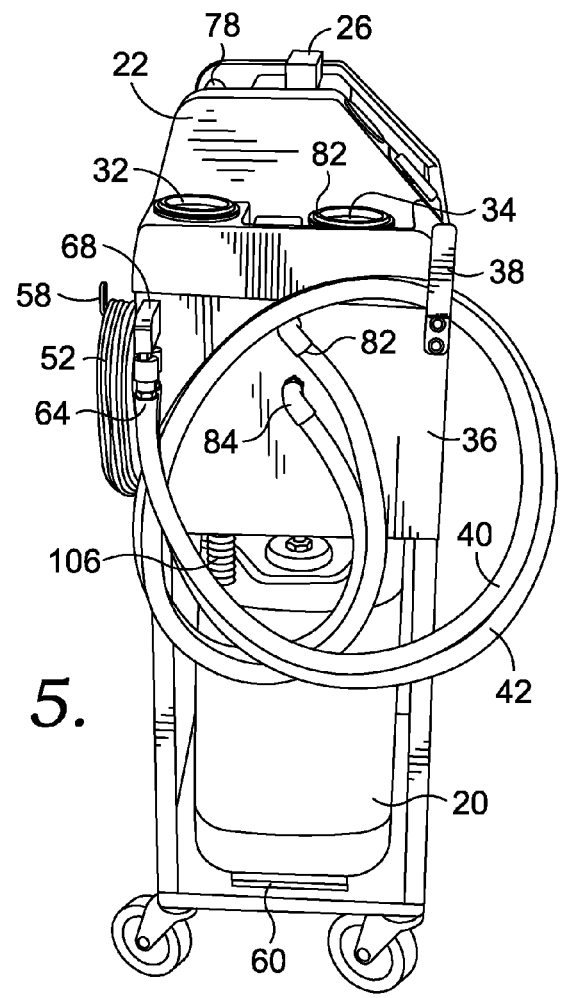
FIG. 5 is a left side perspective view of the machine of FIG. 1.

FIG. 5 discloses a view of the left side 36 of the machine 10. The two hoses 40, 42 are a threadably coupled with the machine 10 at their proximal ends 82 using a pair of 90° elbows 84. The quick couplings 66 at the distal ends 64 of the hoses 40, 42 allows an operator to quickly uncouple the hoses 40, 42 from the hose bracket 68 and connect them into the vehicle's sub-system. The funnels 32, 34 are visible above the hose connections. In this particular figure, the funnels 32, 34 have lids or caps 86 placed thereon.

Figure 6:
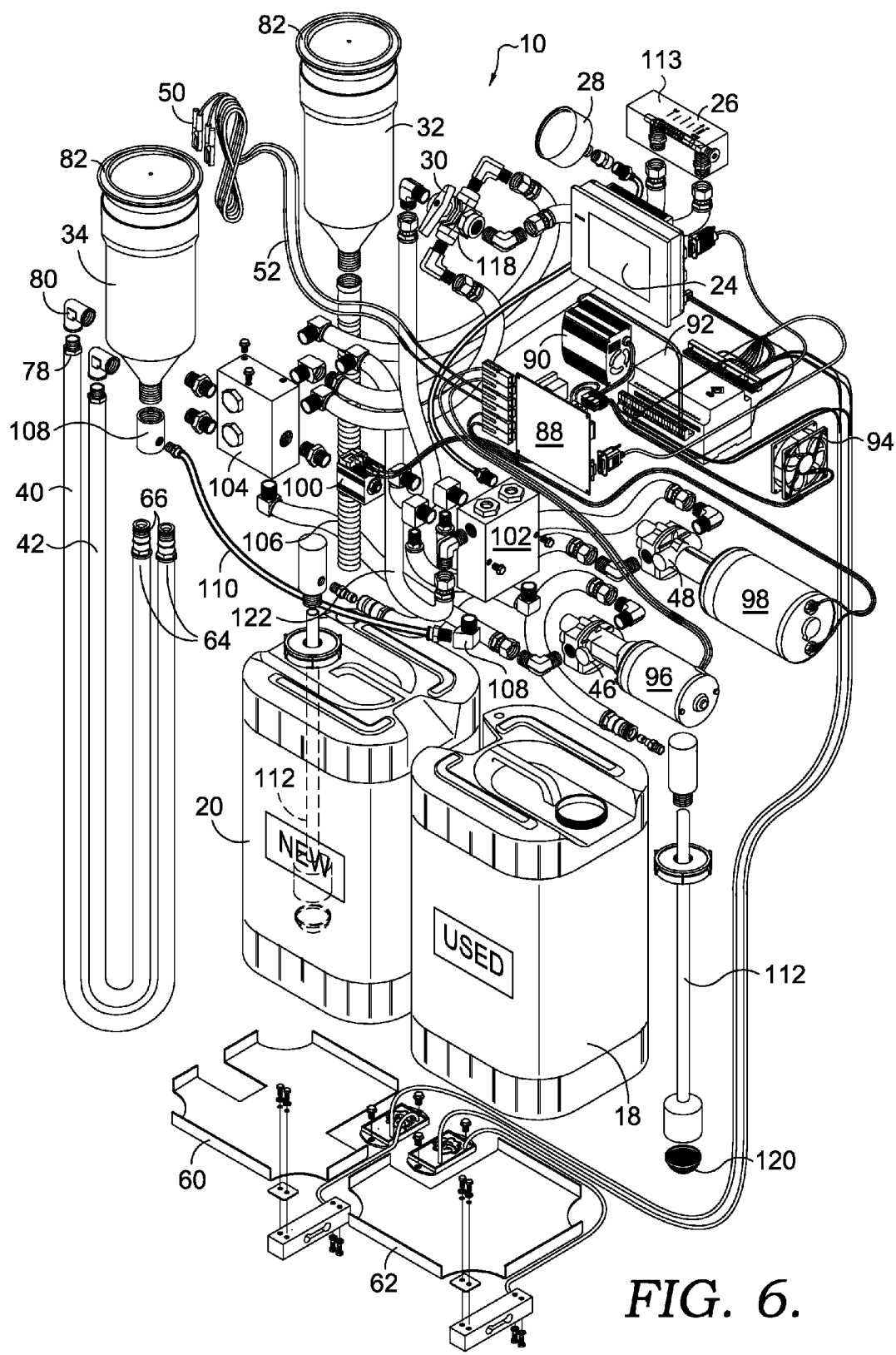
FIG. 6 is an enlarged, exploded, perspective view of the machine of FIG. 1, from a front, top, right vantage point, and with a frame and housing removed to reveal various components of the machine.

FIG. 6 is an exploded view of various internal components of the machine that are generally obstructed by the housing 22 and frame 12, which have been omitted in this figure for clarity. The internal components include both electrical components and plumbing components. The electrical components include a printed circuit board ("PCB") 88 that is electrically coupled to a power controller 90, a programmable logic controller ("PLC") 92, and a cooling fan 94. The power controller 90 may include a transformer and/or an inverter for regulating the power to the machine 10. The PLC 92, as would be understood by one of ordinary skill in the art, is for controlling various components of the machine 10. Also coupled with the PCB 88 are motors 96, 98 that drive the pumps 46, 48, respectively. A solenoid valve 100 is also connected to the PCB 88. The display 24 and the scales 60, 62 are coupled with the PLC 92. The PCB and PLC may be collectively referred to herein as a processor as they collectively execute computer programs and containing a processing unit and a control unit. The operation of these components will be discussed in greater detail below. The electrical components also include a plurality of unnumbered wires, cables, and connectors that permit the electrical components to be in electrical communication (i.e., electrical current and/or signals may pass between them) with each other.

The plumbing components, in addition to those already discussed above (e.g., the funnels 32, 34, the hoses 40, 42, the pumps 46, 48, etc.), also includes a new fluid manifold 102 and a used fluid manifold 104. The manifolds, in the illustrated embodiment, take on the appearance of blocks having various openings or ports 105 therein that communicate with passages or pathways 107 therethrough. The manifolds 102, 104 will be discussed in greater detail below. The new fluid funnel 32 includes a tube 106 that extends from the bottom thereof down into the new fluid tank 20. The chemical funnel 34 is connected to the new fluid manifold 102 by various connectors 108 and a tube 110. Similarly, each tank includes a fluid pickup tube 112 that is coupled with its associated pump 46, 48 via various hoses and connectors. The plumbing components also include a plurality of unnumbered hoses, elbows, tubes, and connectors that permit the plumbing components to be in fluid communication (i.e., fluids may flow between them via various conduits) with each other.

Figure 7:
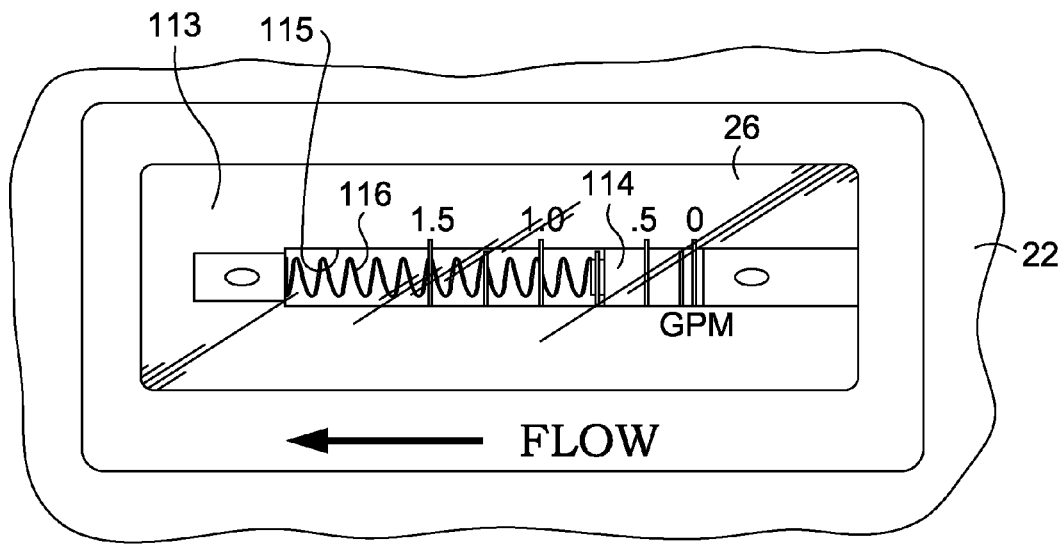
FIG. 7 is an enlarged fragmentary view of a portion of the machine of FIG. 1 illustrating a flow tube.

FIG. 7 is an up close view of the sight tube or sight glass or flow tube 26 of the present invention. It is viewable by the operator on the upper surface 80 of the housing 22. The sight glass 26, in the illustrated embodiment, is preferably a block of transparent material 113, such as glass, plastic, or acrylic, having a passage 115 therethrough. In an alternate embodiment, the sight glass 26 could simply be a clear or transparent tube. When the hoses 40, 42 of the machine 10 are connected with the vehicle's transmission system 44, the machine 10 is in a bypass mode, and the vehicle 16 is turned on, the vehicle's own transmission pump should start circulating the fluid through the vehicle sub-system and through the machine 10 in either direction. If the hoses 40, 42 are connected to the system 44 correctly, fluid will flow through the passage 115 of the sight tube 26 in the direction indicated by the arrow in FIG. 7 and a bullet or slider 114 contained inside the passage 115 in the sight glass 26, which is biased to the right side thereof via a spring 116, will move to the left and compress the spring 116 an amount depending on the amount and force of fluid flow through the sight tube 26 and the bullet 114 (i.e., the bullet 114 has a bore therethrough (not shown) to permit the passage of fluid therethrough). If the machine 10 is hooked into the system 44 in a reverse orientation, the bullet 114 will not move and the operator realizes that the hoses 40, 42 are hooked into the system 44 in a backwards configuration. Fluid, however, will still flow through the sight tube 26, the bullet 114, and the machine 10. Instead of disconnecting the hoses 40, 42 and switching them around, the operator may simply change the orientation of the hoses 40, 42 by using the valve control lever 30 on the upper surface 80 to correct the flow. A proper direction of fluid flow through the machine 10 is important to ensure that fluid enters the manifolds 102, 104 in one direction so the manifolds function properly.

Figure 8:
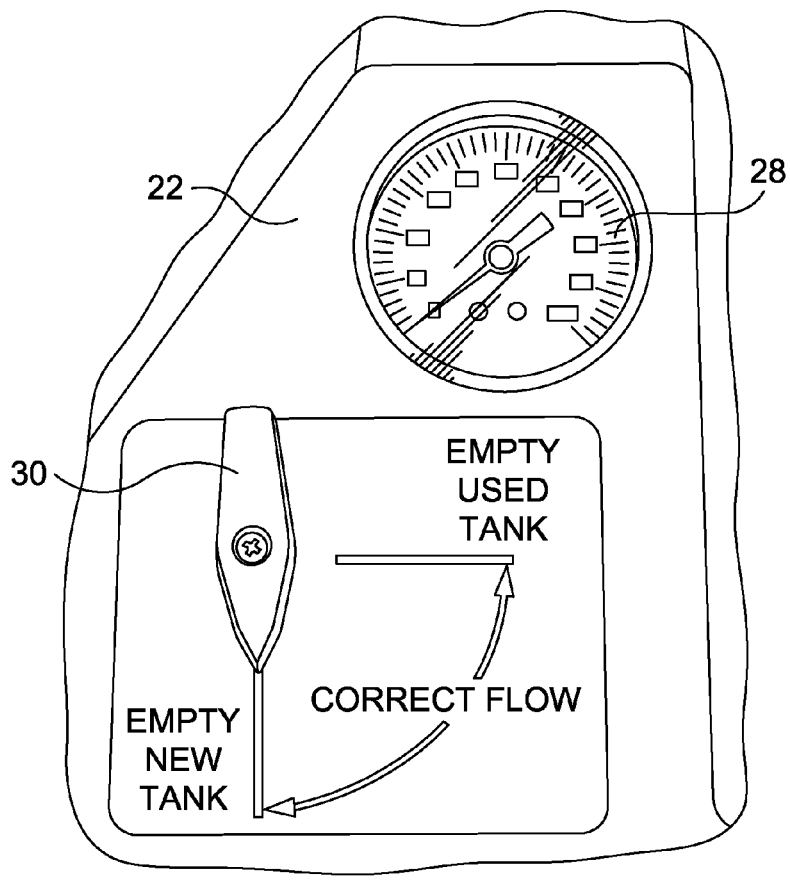
FIG. 8 is an enlarged fragmentary view of a portion of the machine of FIG. 1 illustrating a valve control lever.

FIG. 8 shows the valve control lever 30 that the operator may turn 90° to rotate a ball valve 118 positioned beneath the housing 22 to correct the flow of the fluid through the ball valve 118 and through the machine 10 itself. The pressure gauge 28 informs the operator of the working pressure of the fluid in the vehicle 16 and the machine 10 during operation.

Figure 9:
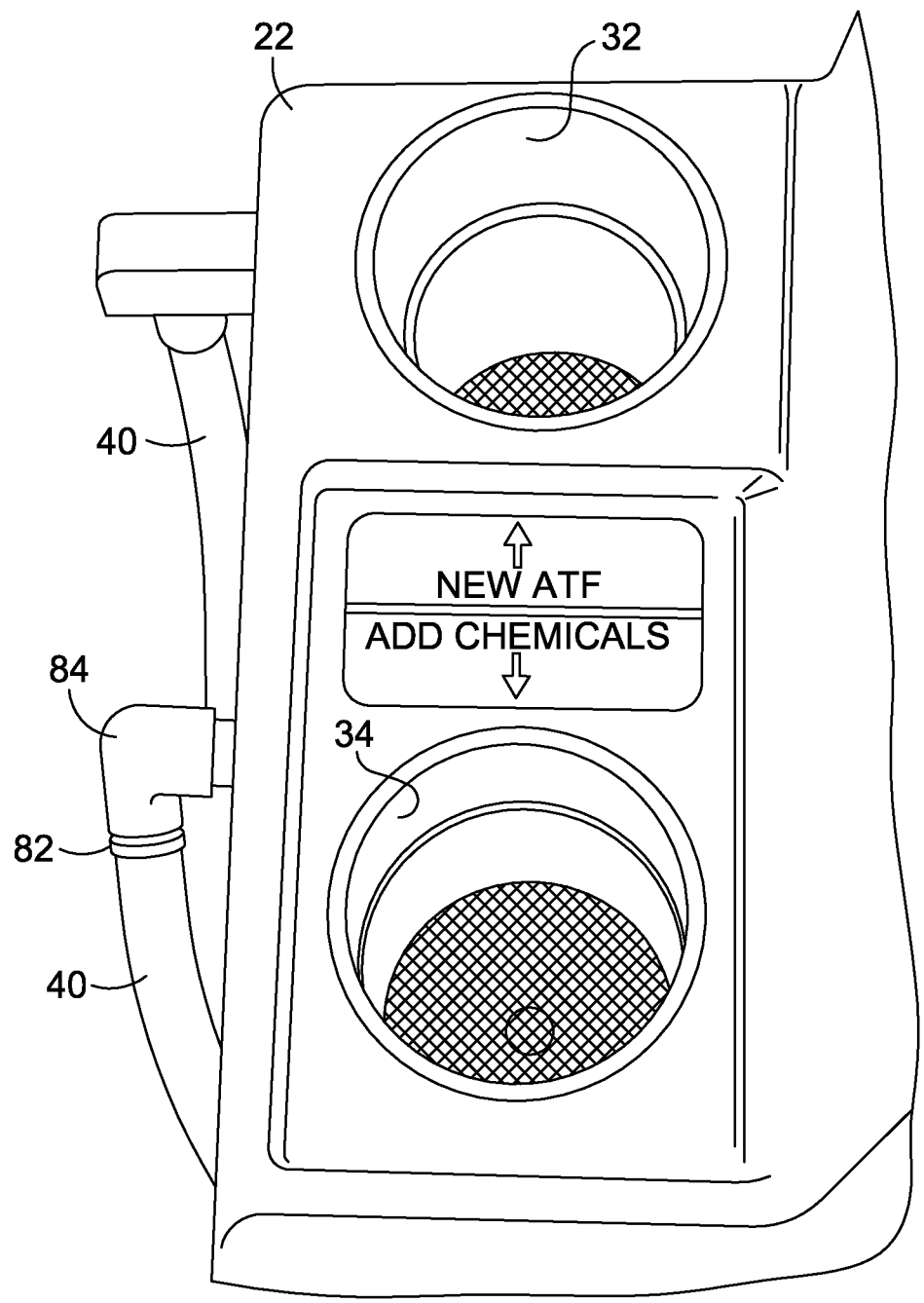
FIG. 9 is an enlarged fragmentary view of a portion of the machine of FIG. 1 illustrating an area with funnels for adding various fluids to the machine.

FIG. 9 is an almost top plan view of the two funnels 32, 34 on the upper surface 80 of the housing 22 where an operator may add new ATF or may add chemicals to the fluid, such as cleaner and/or conditioner during the process, which will be discussed below.

Turning now to FIGS. 10-15, flow diagrams are provided to illustrate the flow of fluid through the machine 10 during various operations of the machine 10. The flow diagram illustrates the ball valve 118 that is operated by the valve control level 30 on the upper surface 80 of the housing 22, the used fluid manifold 104, the new fluid manifold 102, the used fluid pump 46 associated with the used fluid manifold 104, and the new fluid pump 48 associated with the new fluid manifold 102. The solenoid valve 100 is coupled with the used fluid manifold 104 and electronically changes the flow of fluid through the used fluid manifold 104 to either direct the fluid out of the used fluid manifold 104 towards the used fluid pump 46 and ultimately, after passing through a strainer 120, into the used ATF tank 18 in the exchange mode or to the vehicle 16 by exiting out a hose 122 which flows to the new fluid manifold 102 in the bypass mode. The new fluid manifold includes four floating balls 124, 125, 127, 129 that direct the flow of fluid through the new fluid manifold 102 based on their location, which is dependent on the direction fluid is flowing through the new fluid manifold 102. In other words, the new fluid manifold 102 does not include electronically operated valves, like the solenoid valve 100. Instead, the direction fluid is flowing through the new fluid manifold 102 causes the balls to move in different orientations to direct the flow of fluid there through.

Both of the pumps 46, 48 in the machine 10 are reversible. This not only allows the machine 10 to pump fluid into their associated tanks 18, 20, but to withdraw fluid from their tanks 18, 20, as will be discussed below.

Figure 10:
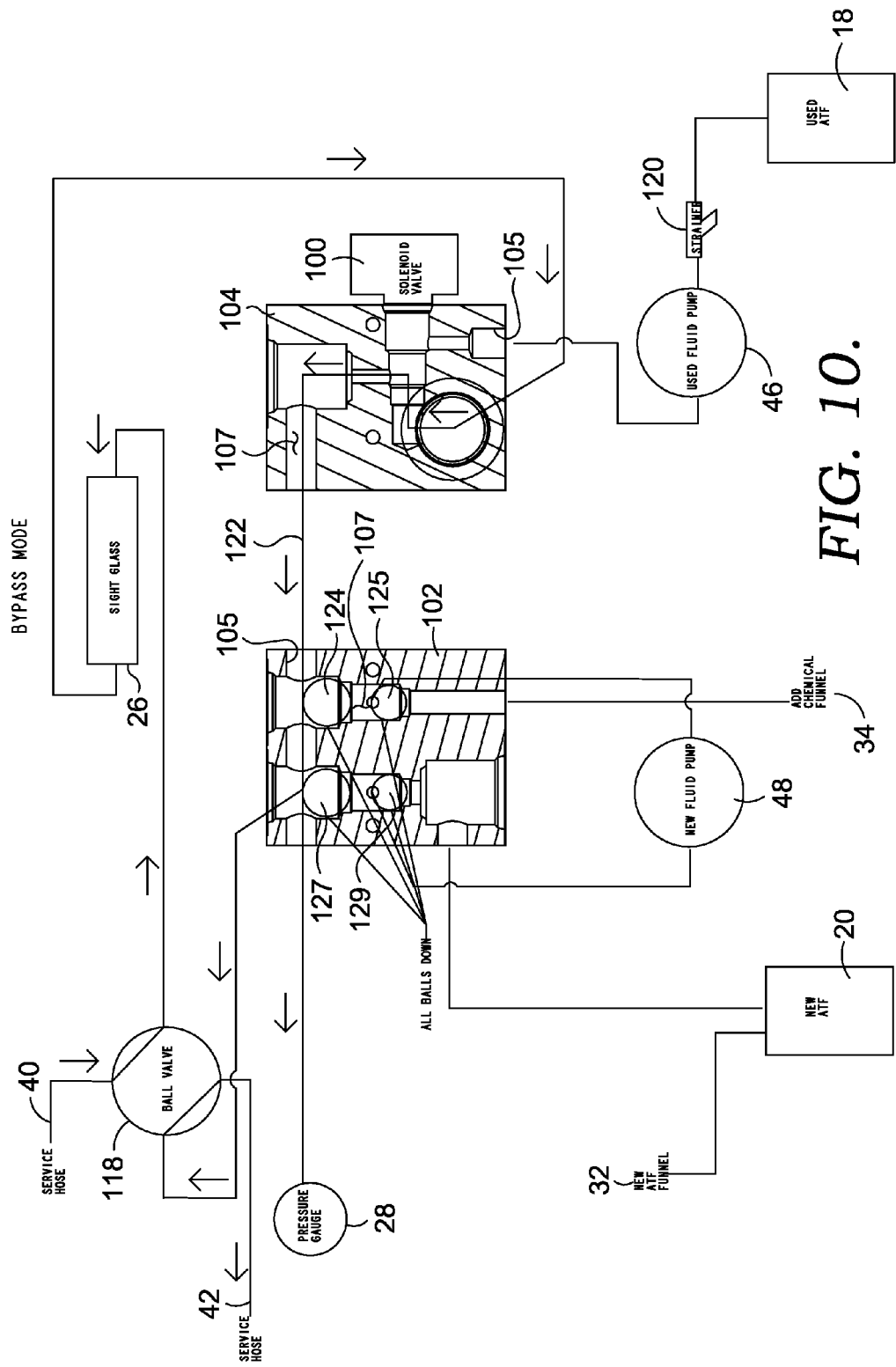
FIG. 10 is a schematic flow diagram illustrating a flow of fluid through the machine of FIG. 1 when in a bypass mode.

FIG. 10 illustrates the flow of fluid through the machine 10 when it is in a bypass mode. In this mode, the machine 10 is not exchanging any fluid from the vehicle 16 but is simply inserted into the fluid flow in the vehicle's system 44 such that whatever the vehicle's pump pumps out of the vehicle 16 through the machine 10 is returned back into the vehicle 16. This mode allows the operator to determine if the machine 10 is connected into the system 44 in the proper orientation. Additionally, it allows the vehicle 16 to operate normally for a period of time, such as when a cleaner has been inserted into the vehicle's system 44 and the cleaner gets circulated through the system 44 to clean the same.

The two service hoses 40, 42 are illustrated in the upper left corner of FIG. 10. Either of the two service hoses 40, 42 may be the in-flow hose where fluid flows into the machine 10, depending on how the hoses 40, 42 are hooked into the system 44. The ball valve 118 may be rotated to connect the in-flow hose 40 to the fluid conduit that leads to the sight glass 26. The fluid flows through the sight glass 26 down into the used fluid manifold 104, through the solenoid valve 100 and out of the used fluid manifold 104 to the new fluid manifold 102. With all four balls 124, 125, 127, 129 being in the down position, the fluid flows out of the new fluid manifold 102 through the ball valve 118 and out the out-flow hose 42 back into the vehicle's transmission system 44. The pressure is read by the pressure gauge 28 and displayed to the operator. It should be noted that for ease of illustration and conception, the service hoses 40, 42 are illustrated as connected directly to the ball valve 118 when, as illustrated in FIG. 6, they actually are connected to the used fluid manifold 104 and then to ball valve 118.

Figure 11:
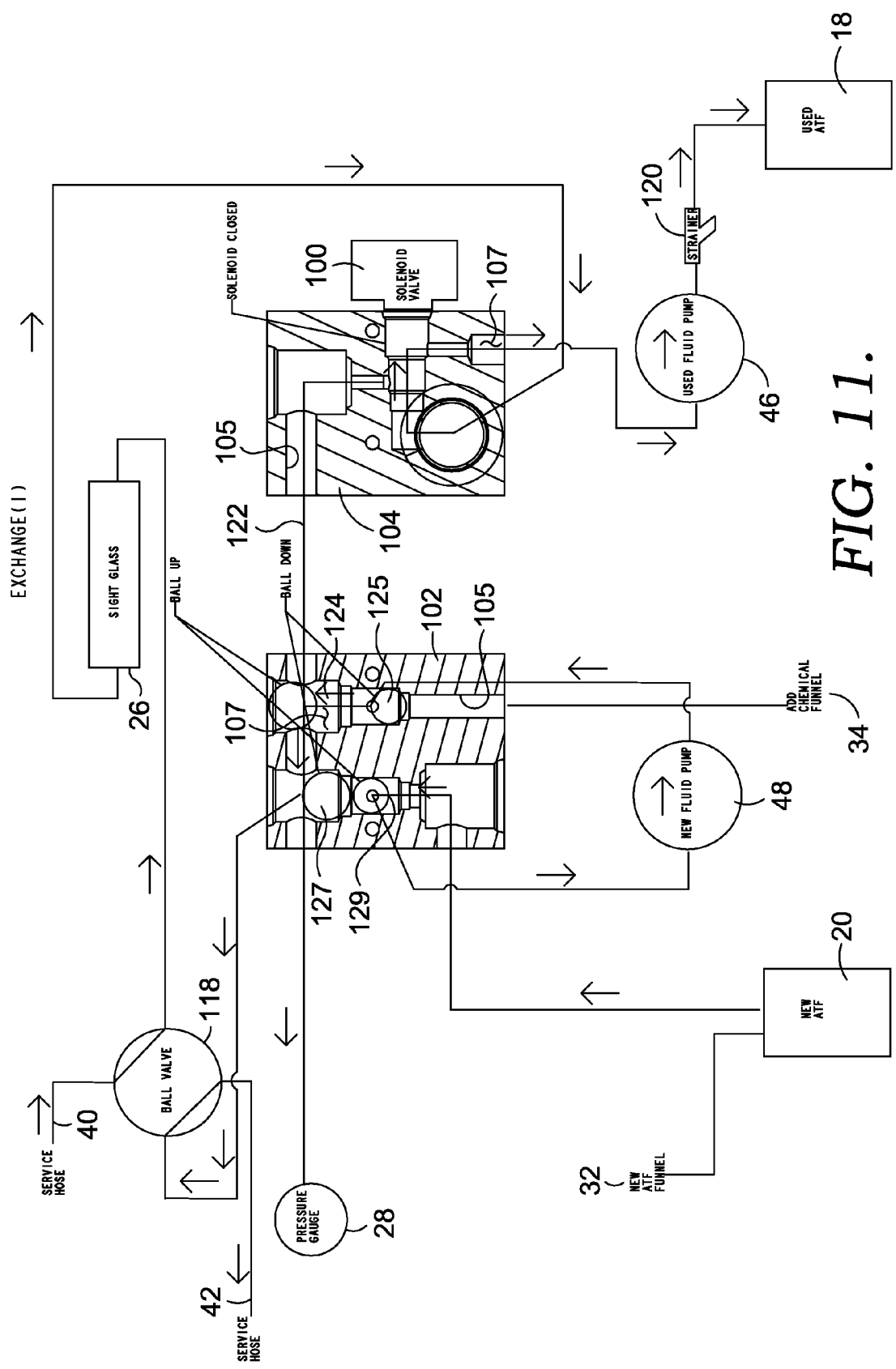
FIG. 11 is a schematic flow diagram illustrating a flow of fluid through the machine of FIG. 1 when in a first exchange mode.
Figure 12:
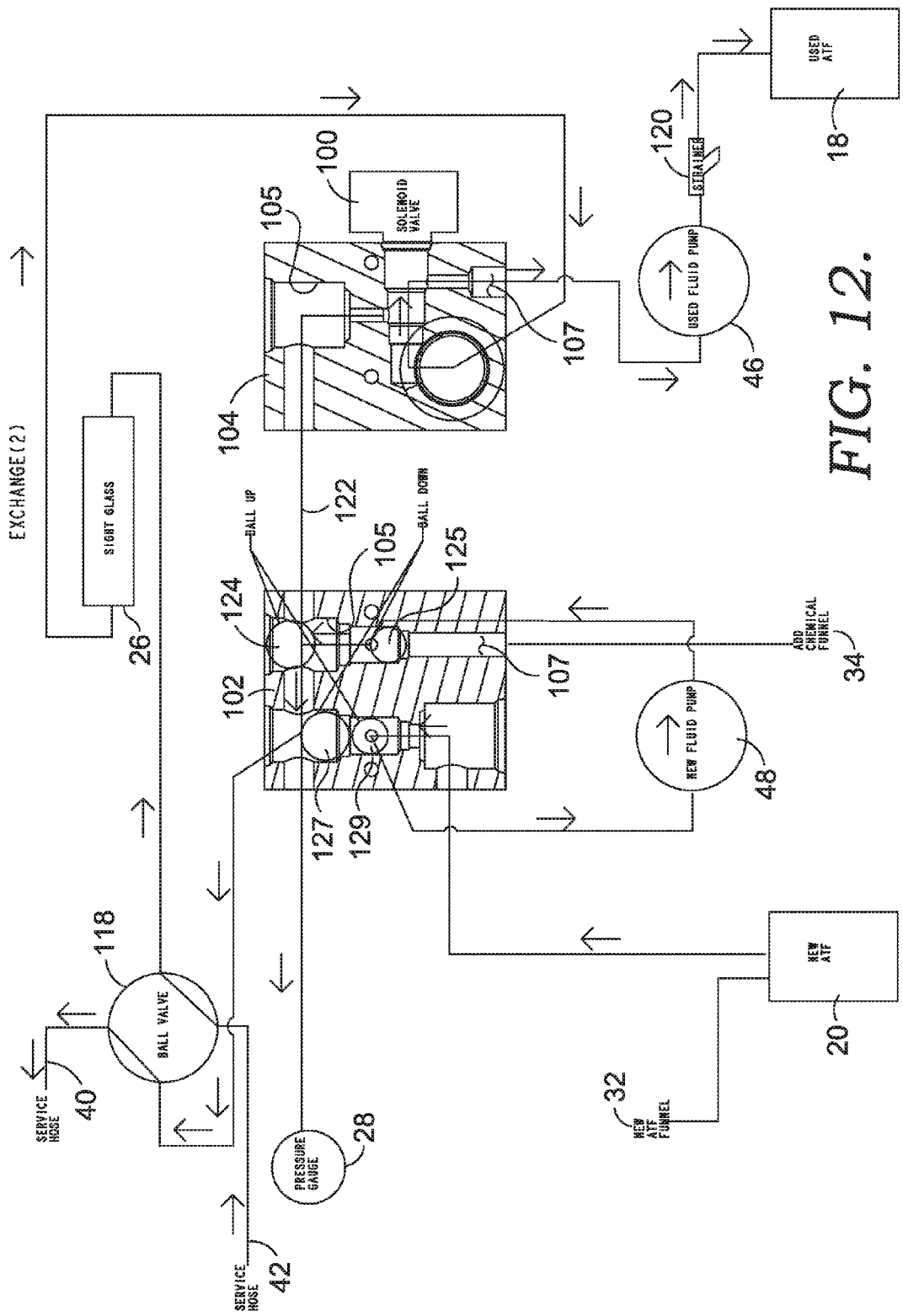
FIG. 12 is a schematic flow diagram illustrating a flow of fluid through the machine of FIG. 1 when in a second exchange mode.

FIGS. 11 and 12 illustrate the machine 10 operating in the exchange mode. FIG. 11 illustrates the top service hose 40 as the in-flow hose, whereas FIG. 12 illustrates the lower service hose 42 as the in-flow hose. When the ball valve 118 is properly oriented, the used fluid flows through the sight glass 26 and down into the used fluid manifold 104. In this mode, however, the solenoid 100 diverts the flow of used fluid out the bottom (in the drawing) of the used fluid manifold 104 down through the used fluid pump 46, through a strainer 120, and out into the used fluid tank 18. In the exchange mode, the used fluid pump 46 preferably assists the vehicle's transmission fluid pump in withdrawing used fluid from the transmission. However, because the vehicle 16 is running during the process and the transmission's fluid pump is operating, new fluid must be replaced at the same volume or level as it is being withdrawn so that the level of transmission fluid in the vehicle's transmission during operation is not decreased or increased, as such could damage the vehicle's transmission. Accordingly, during the exchange operation, the machine's electrical components are monitoring the amount of used fluid removed from the vehicle 10 by weighing the used fluid tank 18.

The weight of the used fluid tank 18 can be used to determine the volume of fluid in the used fluid tank 18 by a simple calculation of weight to known volume. This information is fed through the machine's processor 88 and/or 92 and is used to control the activation of the new fluid pump 48 to withdraw an equal volume of new fluid from the new fluid tank 20. This is measured also by weight and change of weight of the new fluid tank 20. Accordingly, the new fluid motor 98 is variable speed to control the amount of new fluid being removed from the new fluid tank 20 by the new fluid pump 48 depending on the amount of used fluid deposited in the used fluid tank 18. In one embodiment, the used fluid motor 96 is run at a constant speed during the exchange process. In another embodiment, the speed of the motor is variable dependent on the amount of the pressure of the fluid coming out of the vehicle. If the pressure is sufficiently high with only the vehicle's own fluid pump, the used fluid pump 46 may be used very little, if at all. If the fluid pressure is very low, the speed of the used fluid motor 96 may be increased to increase the fluid flow by speeding up the used fluid pump 46 and, in turn, increasing the volume of fluid it is moving.

As illustrated in FIGS. 11 and 12, the new fluid pump 48 is activated to withdraw new fluid from the new fluid tank 20, via one of the fluid pick up tubes 112, which flows from the tank 20 through the new fluid manifold 102, out through the new fluid pump 48, back into the new fluid manifold 102 and out to the vehicle 16 after passing through the ball valve 118. In this orientation, because of the direction of flow of the fluid through the new fluid pump 48, balls 124 and 129 are in an up position while balls 125 and 127 are in a down position. This directs the flow of fluid through the new fluid manifold 102 in the path illustrated.

Figure 13:
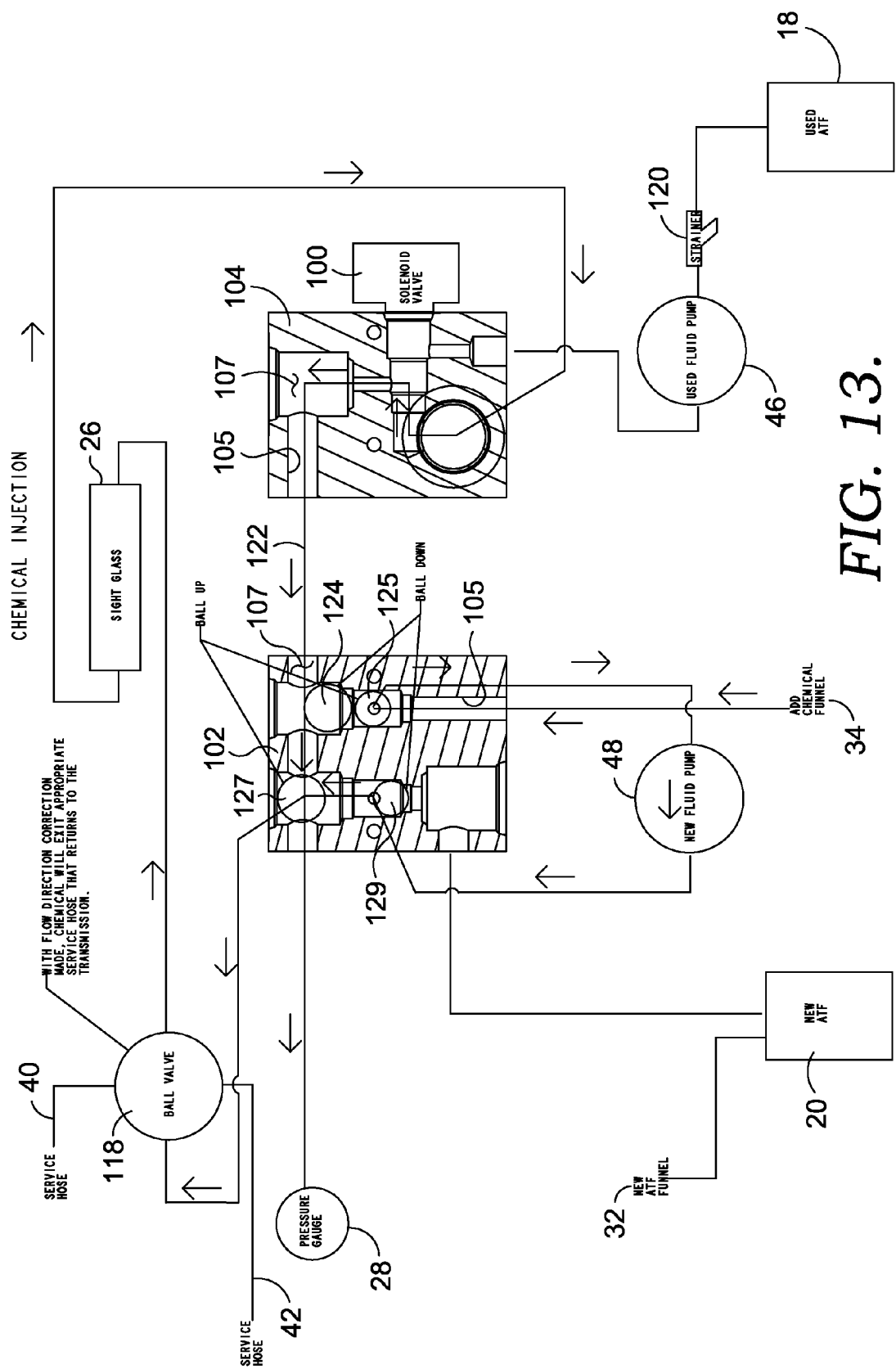
FIG. 13 is a schematic flow diagram illustrating a flow of fluid through the machine of FIG. 1 when in a chemical injection mode.

FIG. 13 illustrates a chemical injection mode. In this mode the machine 10 is operated to introduce a chemical such as a cleaner or a conditioner to the vehicle's system 44. The desired chemical is poured into the chemical funnel 34 on the top of the machine 10 and the new fluid pump 48 is activated to draw the chemical down from the funnel 34, through the new fluid manifold 102, out through the new fluid pump 48 in a direction opposite of the flow during the exchange process, back into the new fluid manifold 102 where it mixes with system 44 fluids, and then out of the new fluid manifold 102 to the vehicle 16 after passing through the ball valve 118. In this mode, the balls in the new fluid manifold 102 are oriented as illustrated to direct the fluid through the new fluid manifold 102 in the desired path. Accordingly, when the new fluid pump 48 is run in a first direction the pump 48 withdraws fluid from the new fluid ATF tank 20. When the pump is operated in an opposite direction, it withdraws fluid from the chemical funnel 34. In both directions, the fluid is forced out of the new fluid manifold 102 towards the ball valve 118 and towards the vehicle 16.

Figure 14:
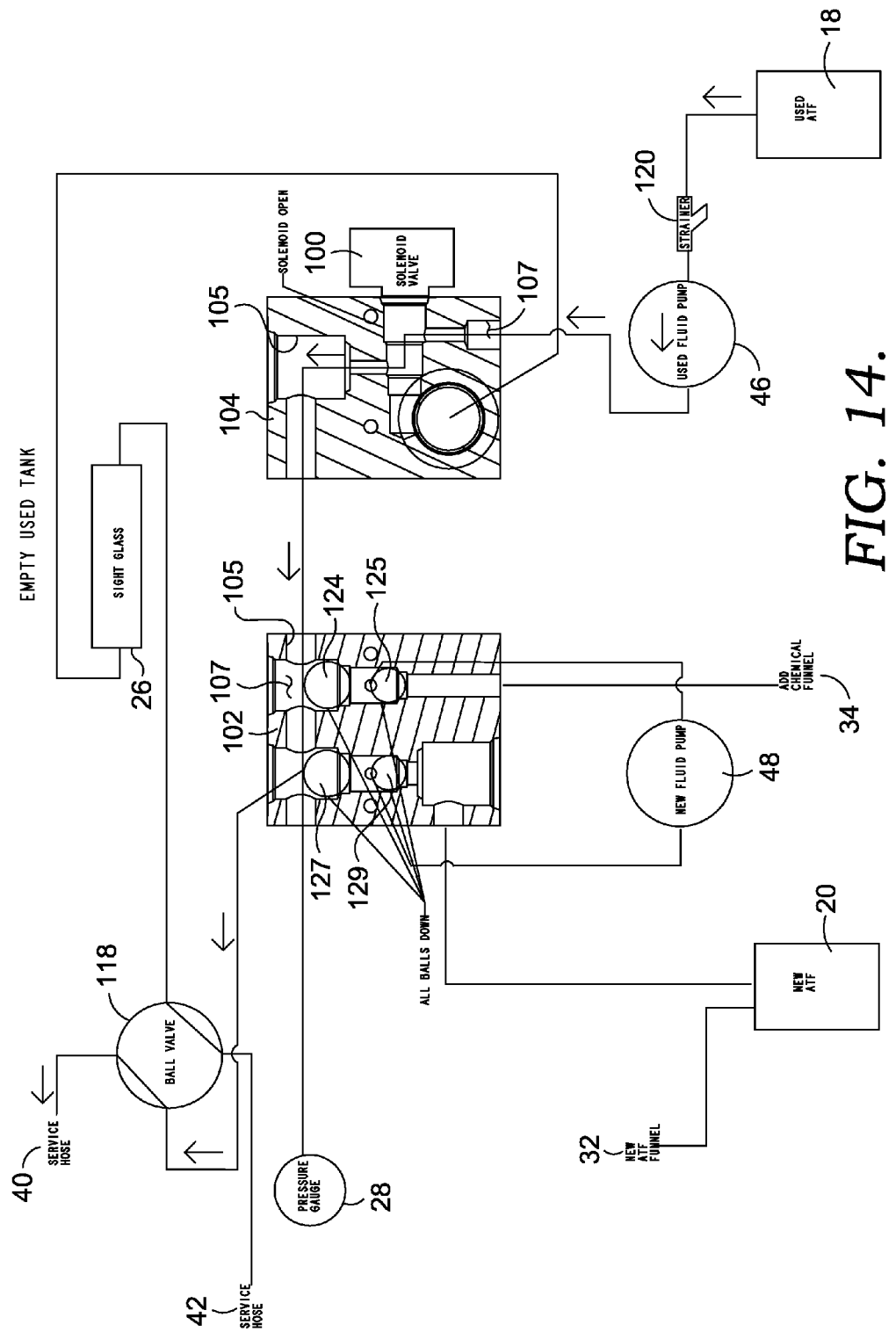
FIG. 14 is a schematic flow diagram illustrating a flow of fluid through the machine of FIG. 1 when in an empty used fluid tank mode.
Figure 15:
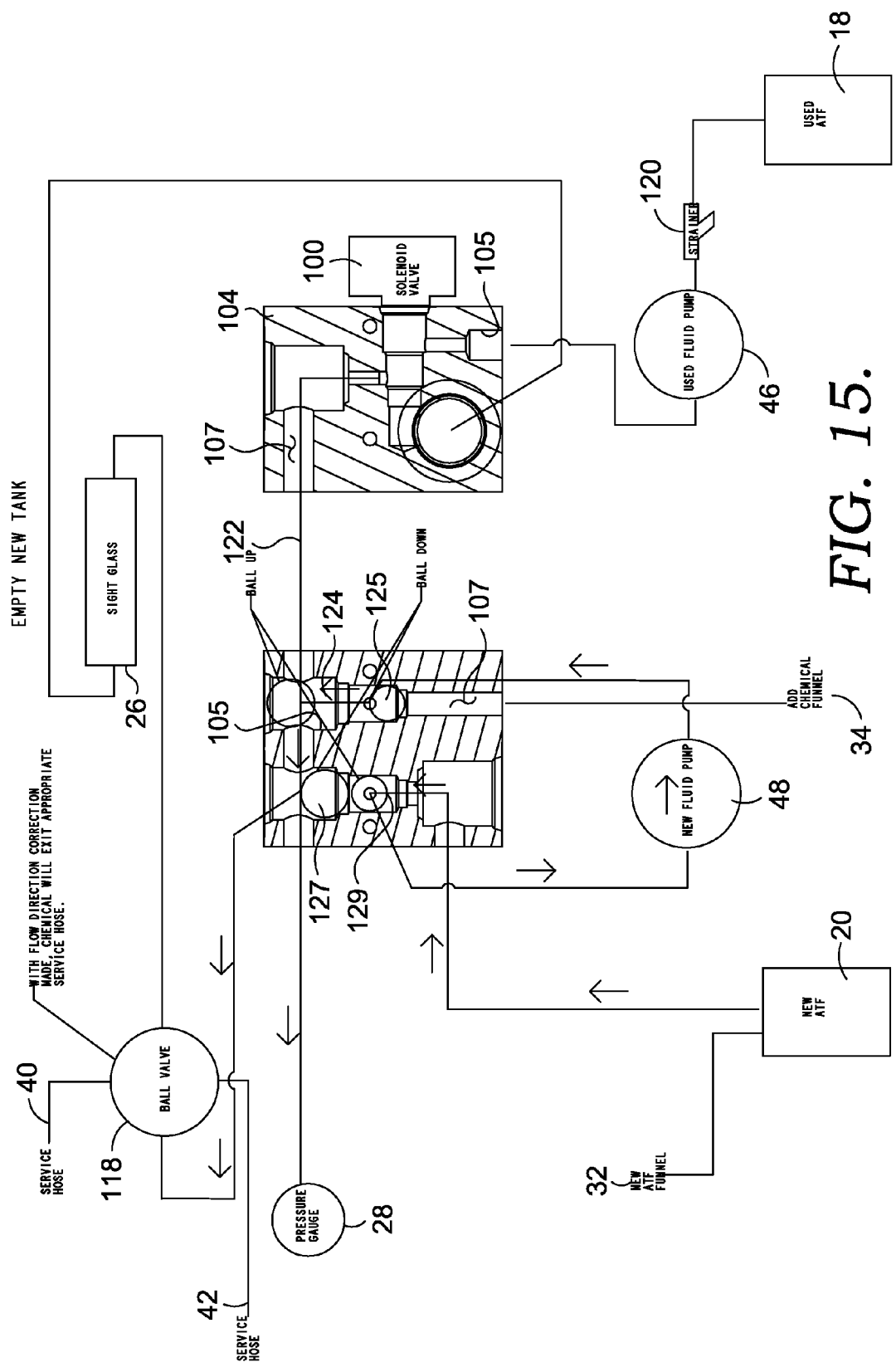
FIG. 15 is a schematic flow diagram illustrating a flow of fluid through the machine of FIG. 1 when in an empty new fluid tank mode.

FIG. 14 illustrates an empty used fluid tank mode where the machine 10 may be operated so as to withdraw used fluid from the used fluid ATF tank 18 and expel it into a suitable collection container (not shown). The used fluid will not be pumped back into a vehicle 16, but would be deposited into a storage container where it can be sent out of the shop for recycling. This is done by connecting the free or distal end 64 of one of the service hoses 40, 42 (as illustrated, hose 40) to a used fluid bulk storage tank. The used fluid pump 46 is then operated in a direction opposite of its operation during the exchange mode. Similarly, FIG. 15 illustrates the machine 10 in a mode where the machine 10 is used to empty the new fluid ATF tank 20. This operation is similar to its flow during the normal fluid exchange process; however, the free end 64 of the service hose 40 or 42 is placed in a receptacle to receive the new ATF fluid. This could be used to change the type of ATF in the tank prior to a service operation.

The display 24 may be a monitor, a video display, a graphic display or the like and is used to direct the service technician or operator through the correct use of the machine 10 during an exchange procedure or service. This is accomplished by presenting the operator with a plurality of screenshots that tell them which steps to take. We will now walk through the operation of the machine 10 as directed by the screenshots in FIGS. 16-47.

Figure 16:
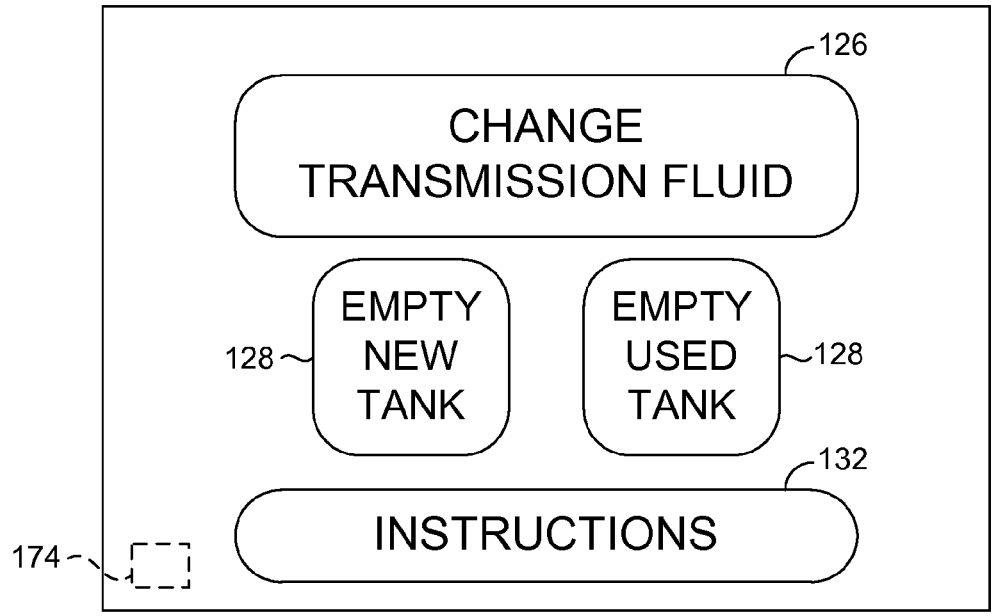

Turning first to FIG. 16, an illustration of an exemplary screen that initially displays on the machine's display 24 at start up (i.e., the Home Screen) is provided. The screen gives the user the options of the programs the machine 10 can run and instructions by way of icons or buttons 126, 128, 130, 132. The display 24 may be a touch screen monitor. Upon the user touching Change Transmission Fluid button 126, the display changes to the illustration in FIG. 17.

Figure 17:
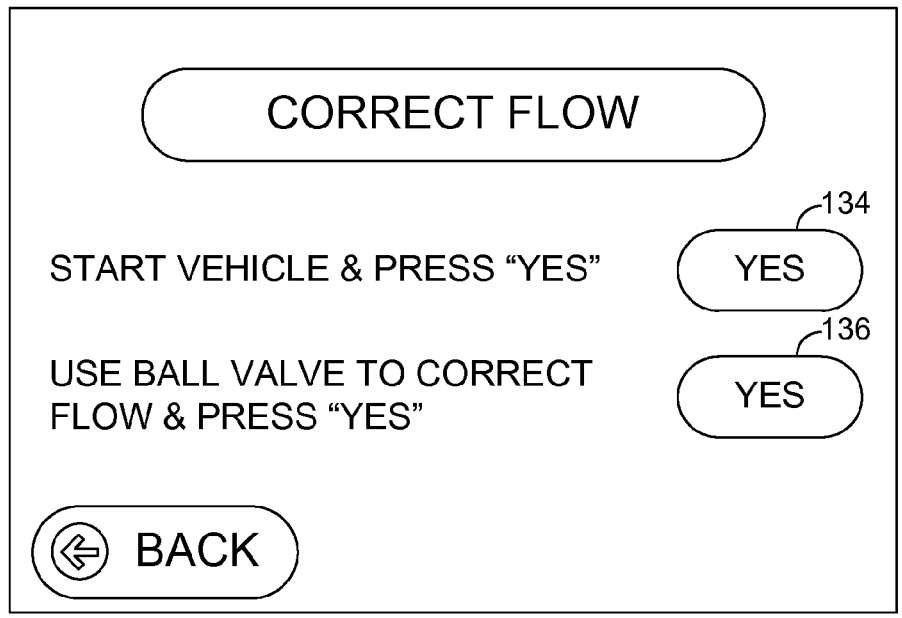

FIG. 17 illustrates a "correct flow" selection screen that informs the operator to start the vehicle 16 and then press a "Yes" button 134. The user then looks at the fluid flow tube 26 to see if fluid is flowing through the machine 10 correctly. If it is, they do nothing to the ball valve 118. If it is not, they rotate it 90° via the valve control lever 30. With fluid flowing correctly through the machine 10, the operator presses a second "Yes" button 136 and a "Next" button (not show) will appear on the bottom of the screen. When the operator hits the "Next" button, the display changes to the illustration in FIG. 18.

Figure 18:
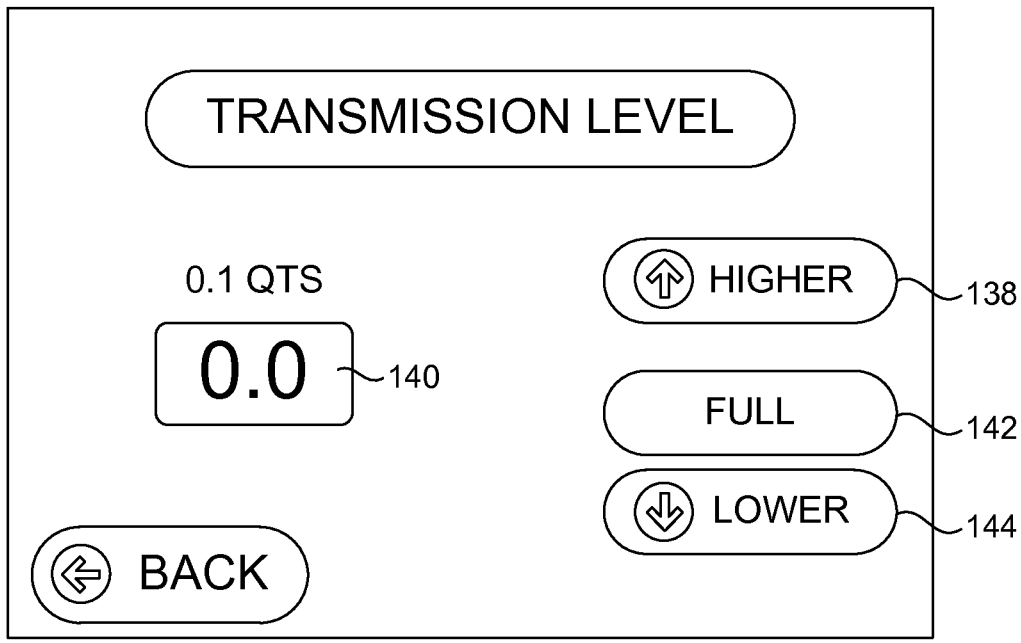

FIG. 18 illustrates a selection screen that pertains to the amount or level of transmission fluid in the vehicle 16. The operator pulls the vehicle's dipstick on the transmission and manually checks the fluid level in the transmission. If it is low and more fluid is needed to be added to get it to full, the operator presses a "Higher" button 138 until the desired amount to add shows in display window 140 (e.g., since the meter here is 0.1 quarts, if the transmission is a half quart low prior to service, the operator would tap the "Higher" button 138 five times to add a half quart). If it's full and it's right where it's supposed to be on the dipstick, then the user presses the "Full" button 142. If the dipstick reading reveals that the transmission is overfull and fluid needs to be removed, the "Lower" button 144 is pressed an appropriate number of times to get to the proper amount to be withdrawn. The machine 10 will store this information and correct accordingly during the exchange mode.

Figure 19:
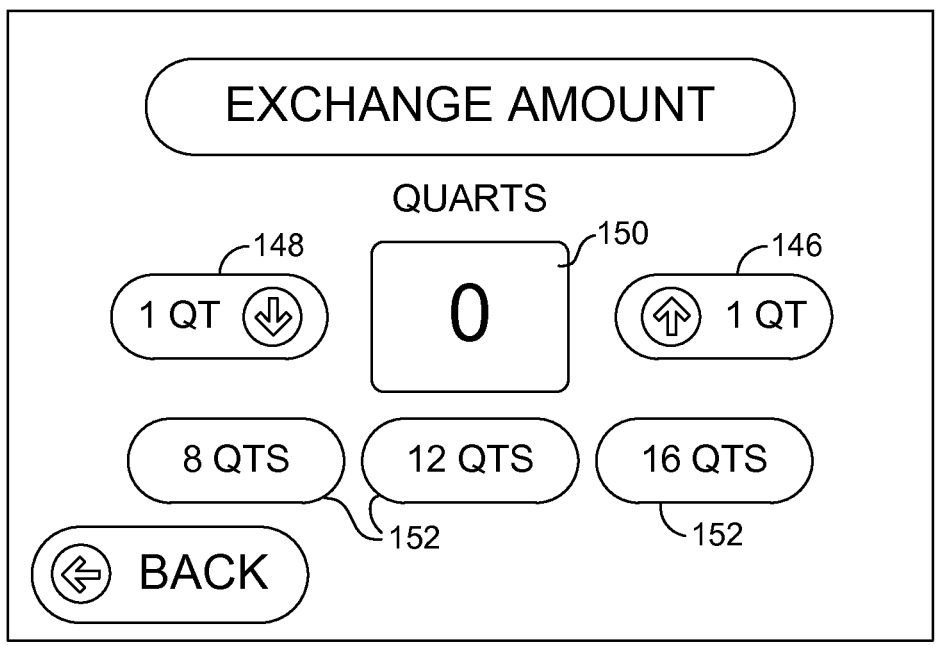

FIG. 19 illustrates a selection screen that permits the user to tell the machine how many quarts to exchange, e.g., 16 quarts. The user may press the up "1 qt" button 146 or down "1 qt" button 148 to raise or lower the amount displayed in window 150. The user could also use any of the pre-selected amount buttons 152 near the bottom of the screen. Upon selection of an amount of fluid to exchange, a "Next" button (not shown) appears and, when pressed, the display changes to the illustration in FIG. 20.

Figure 20:
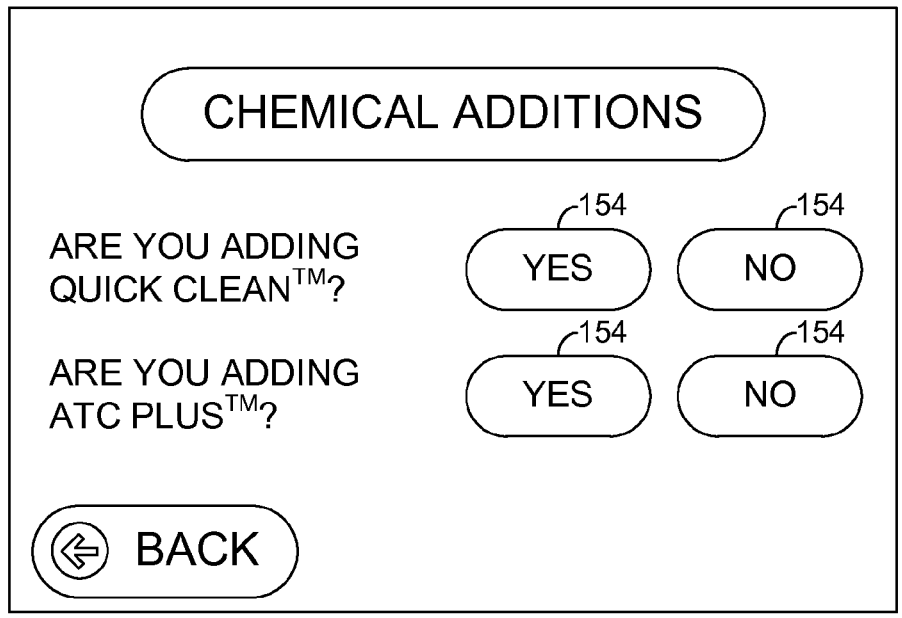

FIG. 20 illustrates a screen that queries the user to determine if any chemicals are going to be added during the process. For example, a transmission system cleaner, such as Quick Clean™ by BG Products, may be added. If adding, the operator presses a "Yes" selection button 154. If not, the operator presses "No" selection button 154. A transmission fluid conditioner, such as ATC Plus™ by BG Products, may also be added or not by selecting the appropriate selection button 154. Once both selections are made, a "Next" button (not shown) appears and, when pressed, the display changes to the illustration in FIG. 21, if the user indicated a cleaner is going to be added, or FIG. 23, if no cleaner is being added. This is because the cleaner does not stay in the vehicle transmission system 44 during normal operation of the vehicle. Instead, a cleaner is simply run through the system 44 in the bypass mode for a predetermined amount of time prior to being removed via the exchange process.

Figure 21:
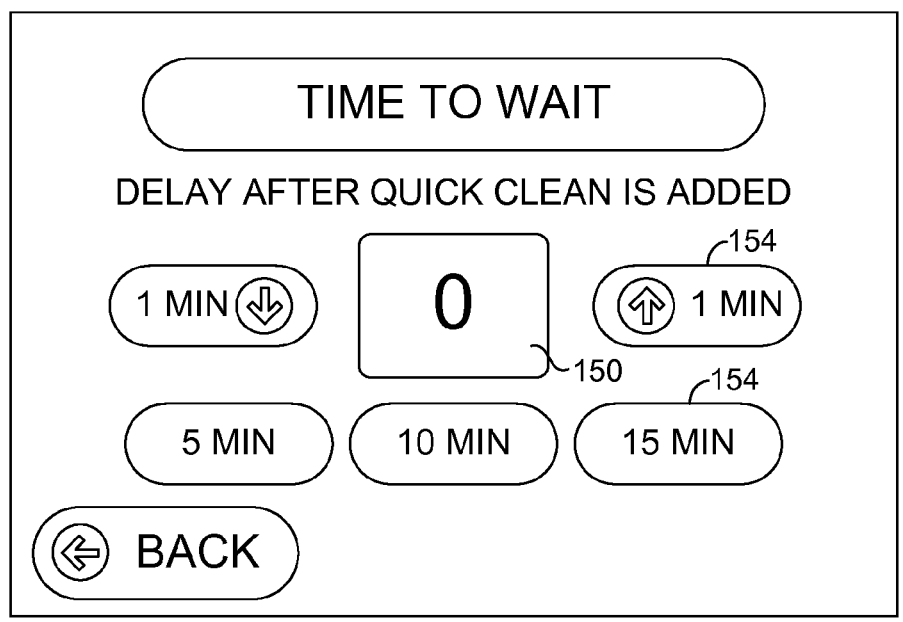

Accordingly, FIG. 21 illustrates a screen that queries the operator to determine how long the operator wants the cleaner to run through the system 44 before starting the exchange process. The operator selects the duration by pressing the appropriate buttons 154, similar to FIG. 19, and presses the "Next" button when the desired duration is displayed in the window 150.

Figure 22:
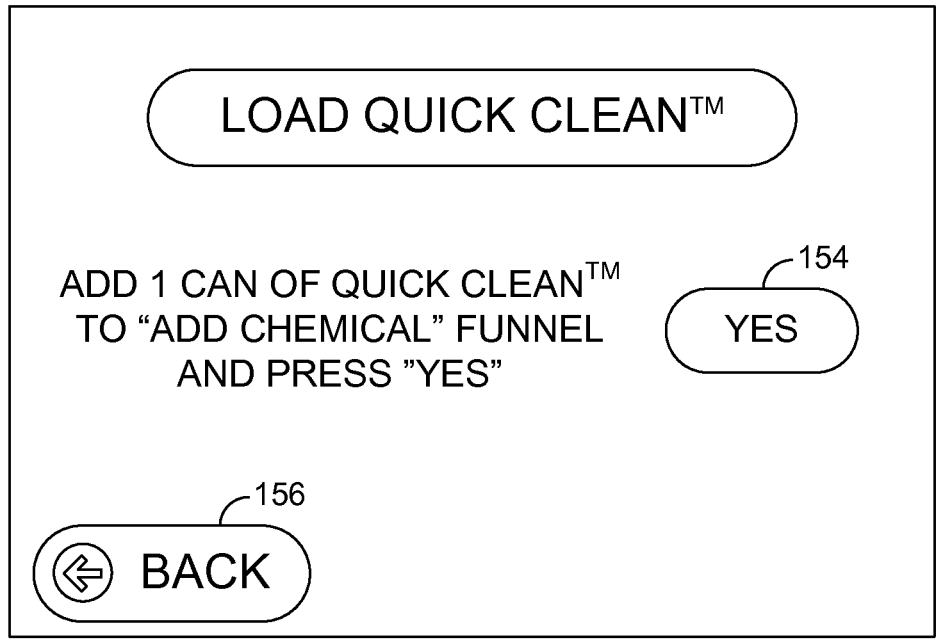
Figure 23:
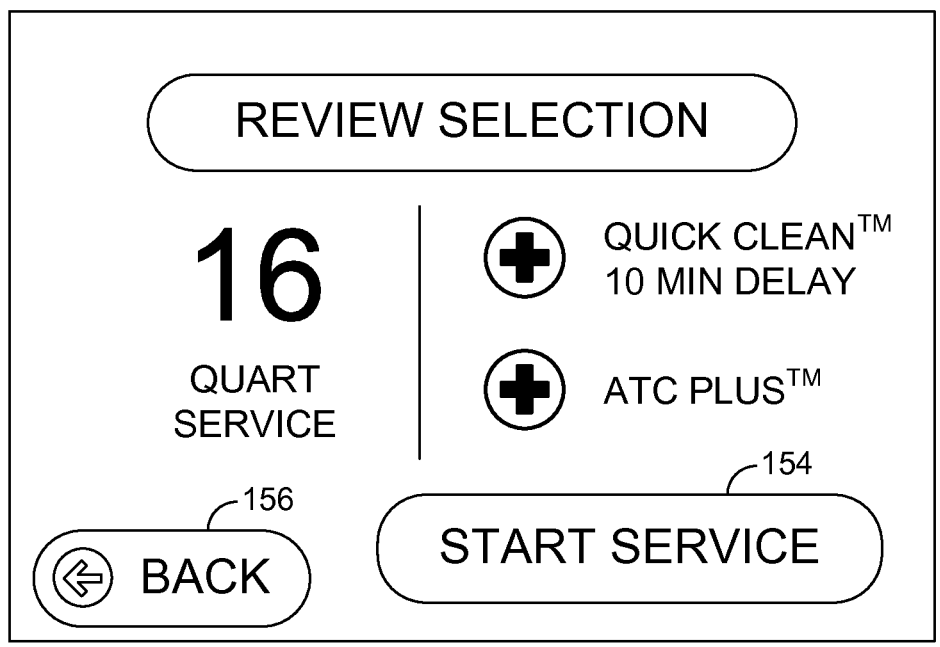

FIG. 22 illustrates a screen that prompts the operator to pour the Quick Clean™ cleaner into the "Add Chemical" funnel 34. After doing so, the operator presses the "Yes" selection button 154 and then the "Next" button. At this point, the machine 10 is still in the bypass mode, so the used ATF is circulating through the vehicle 16 and the machine 10. FIG. 23 illustrates a screen that displays the entire process for review. In the illustrated example, the screen indicates that a 16 quarts exchange will occur after injecting the cleaner and waiting for 10 minutes to allow the cleaner to be circulated through the system and that a conditioner will be added after the exchange. If all of the information is correct, the user presses the "Start Service" selection button 154. If something is not correct, the user presses the "Back" button 156 to go back as many screens as necessary and make the desired changes.

After pressing the "Start Service" selection button 154, a screen similar to that illustrated in FIG. 24 is displayed, which indicates that the machine 10 is adjusting the fluid level in the vehicle's transmission before starting the exchange process to ensure a proper service occurs. This action takes into account the amount the user previously requested the fluid level to be changed to bring it to full and the amount of cleaner to be used. The machine 10 then switches to the chemical injection mode and displays a screen similar to that illustrated in FIG. 25. As discussed above, in the chemical injection mode the new fluid pump 48 is operated to draw the cleaner out of the funnel 34, down into the pump 48 and then out into the vehicle 16. The process screen of FIG. 25 conveys the amount of time remaining for this step. While the pump 48 is programed to run for a predetermined amount of time to complete the chemical injection mode step, if the operator sees that all of the chemical is gone from the funnel 34, the operator my press the "Funnel Is Empty" button 158 to cause the pump 48 to stop and the completion of the chemical injection mode step.

Figure 26:
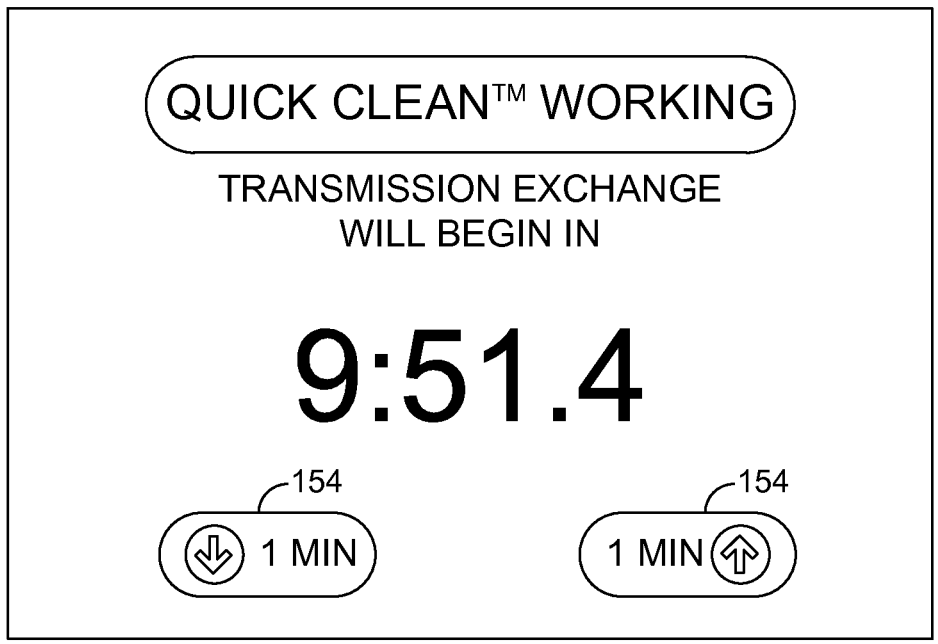

Upon completion of the addition of the cleaner step, the machine 10 displays a process screen similar to FIG. 26 that counts down the duration that the cleaner is circulated through the system in the bypass mode. The operator may manually increase or decrease the duration at this point by using the selection buttons 154 along the bottom of the screen.

Figure 27:
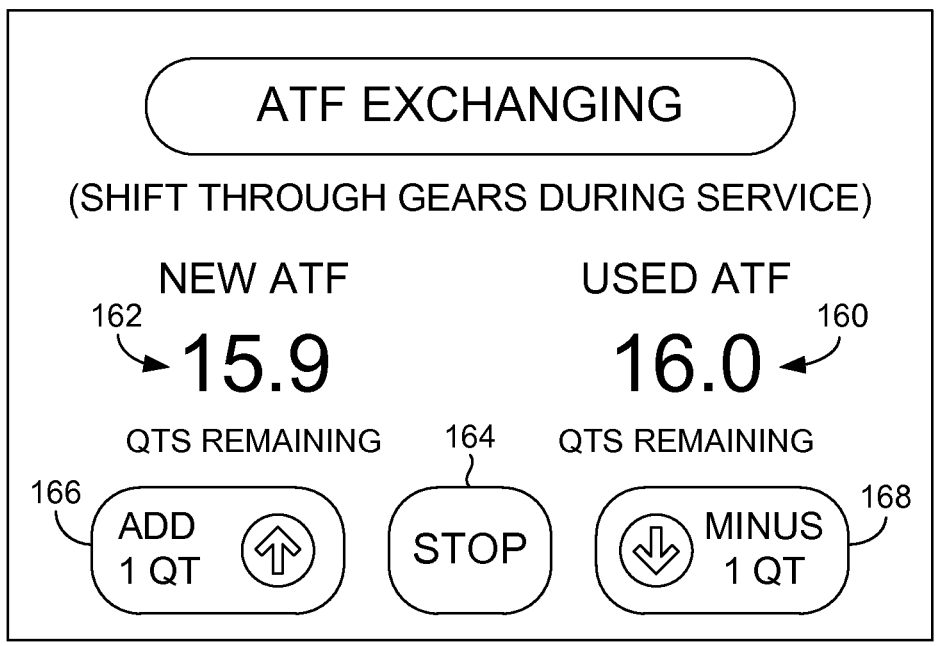

Upon completion of the cleaning cycle step, the machine 10 displays a process screen similar to FIG. 27 and the ATF exchange service step begins. As used ATF is removed, a USED ATF countdown counter 160 is displayed that illustrates the quarts remaining to be exchanged. Similarly, as new fluid is added, a NEW ATF countdown counter displays the amount of new fluid left to be introduced into the system 44. The ATF Exchanging screen also includes a "Stop" button 164, that allows the operator to stop the exchange step should it be necessary, an "Add 1 Qt." button 166, and a "Minus 1 Qt."

button 168, to allow the operator to increase or decrease the amount of fluid to be exchanged.

Figure 28:
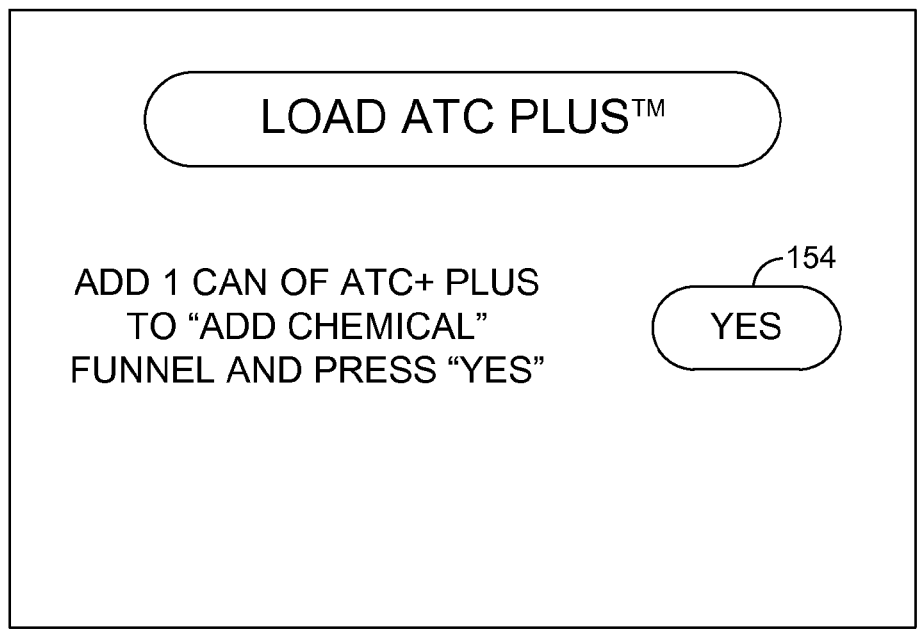
Figure 29:
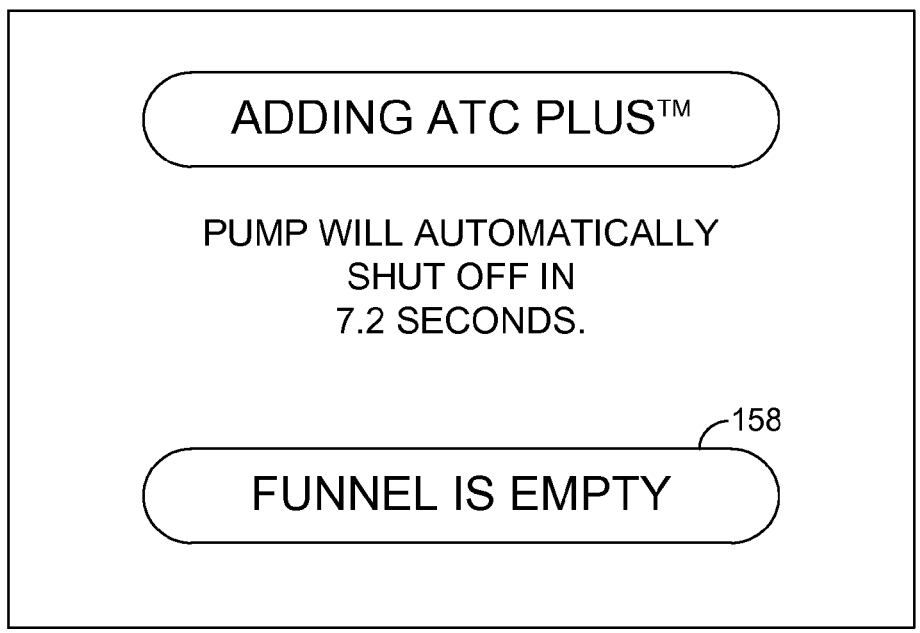
Figure 30:
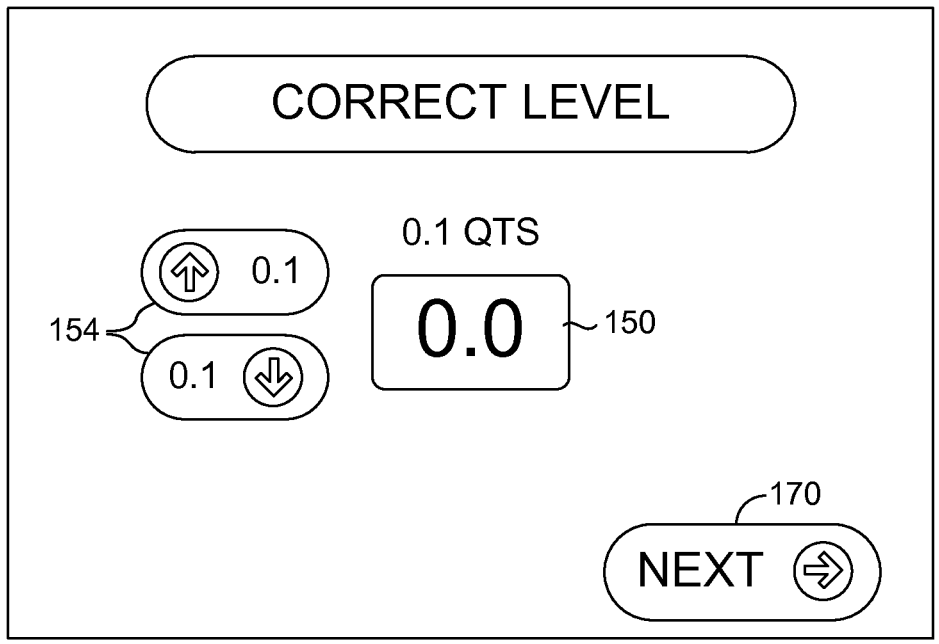

Once the exchange process is completed, the machine 10 switches back to the bypass mode and the machine 10 displays a process screen similar to FIG. 28. The user is prompted to pour the conditioner into the Add Chemical funnel 34. After doing so, they press the "Yes" selection button 154 and then a "Next" button appears that, when pressed, causes the display 24 to change to a process screen similar to FIG. 29. FIG. 29 illustrates an adding conditioner step. The display 24 informs the operator that the chemical is being drawn out of the funnel 34 by the pump 48 and inserted into the vehicle's system 44 and how much time is remaining for this step. If the funnel 34 is empty before the time allotted for the pump 34 to withdraw the fluid from the funnel 34, the operator may conclude the step by pressing the "Funnel Is Empty" button 158. The machine 10 accommodates for the volume of the conditioner being added by removing an equal amount of ATF from the vehicle's system 44.

After the conditioner is inserted, the chemical injection mode stops and the bypass mode resumes. The display then shows a process screen similar to FIG. 30 that prompts the operator to manually check the vehicle's transmission fluid level again. If the dipstick indicates a high or low fluid level, the operator informs the machine 10 how much to take out or add by way of the selection buttons 154 and then presses the "Next" button 170. The machine 10 then either removes or adds the correct amount of ATF or does nothing if at the proper level.

Figure 31:
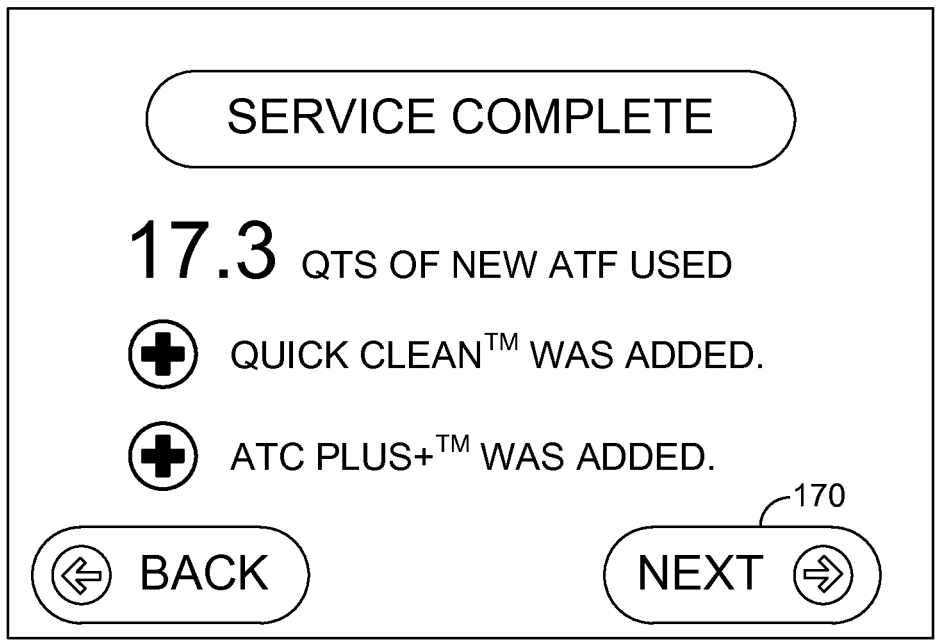
Figure 34:
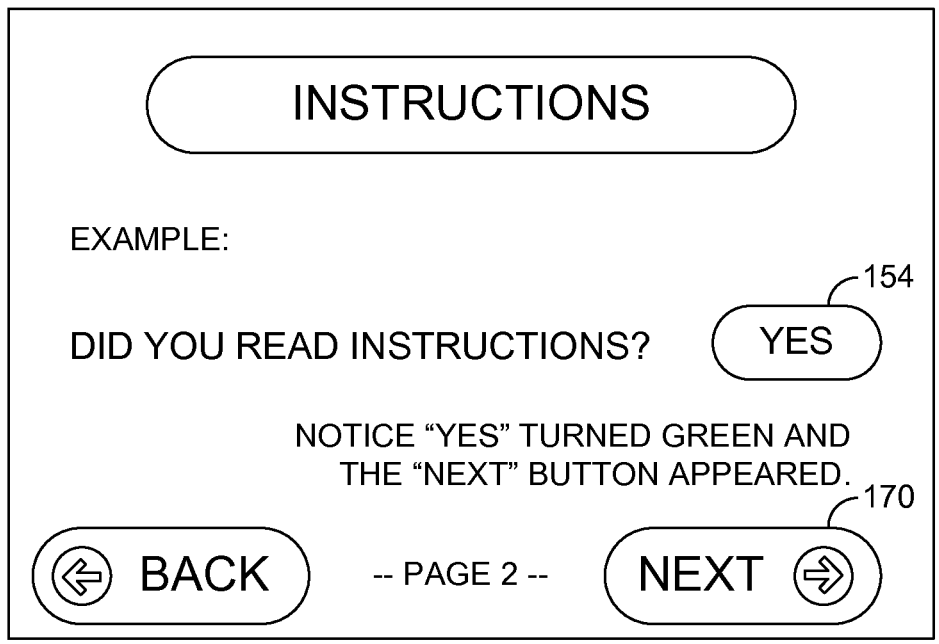
Figure 35:
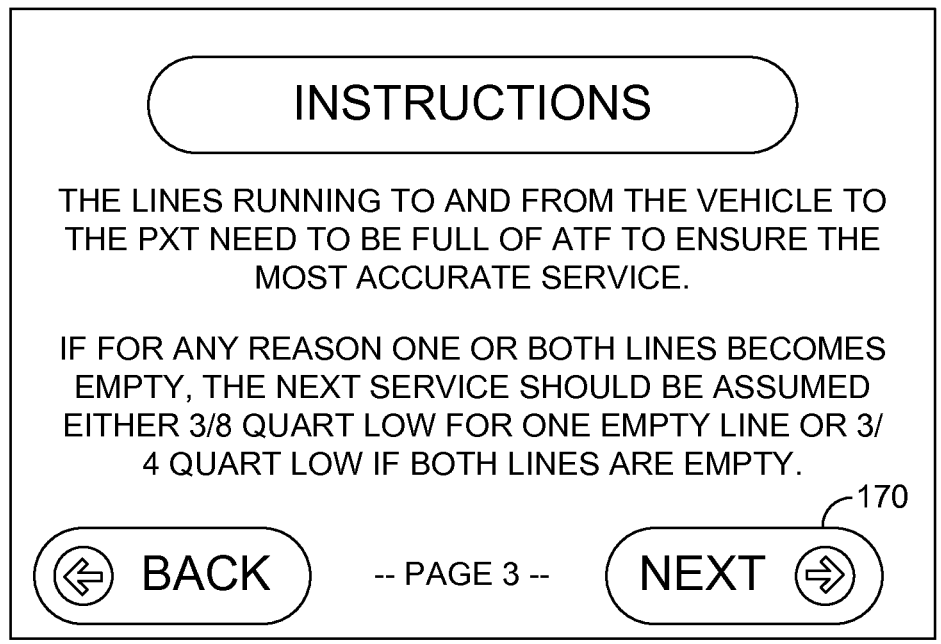

FIG. 31 illustrates an overview screen that informs the operator of the processes that were performed. In this case Quick Clean™ cleaner and ATC Plus™ conditioner were added and 17.3 quarts of new fluid were used. The operator presses the "Next" button 170 and a second Service Complete screen, FIG. 32, informs the operator the service is completed, that they need to shut the vehicle 16 off, remove the hoses 40, 42, check for leaks, and disconnect the power cord 52 from the vehicle 16. Pressing the "Next" button 170 returns the display 24 to the Home Screen, illustrated in FIG. 16.

On the Home Screen, FIG. 16, the user may select the "Instructions" button 132. Selecting this button 132 causes the display 24 to display a first Instructions screen, illustrated in FIG. 33. The Instruction screens, illustrated in FIGS. 33-37 walk users/operators through a set of basic instructions on what the buttons do and how to operate the machine 10.

Figure 38:
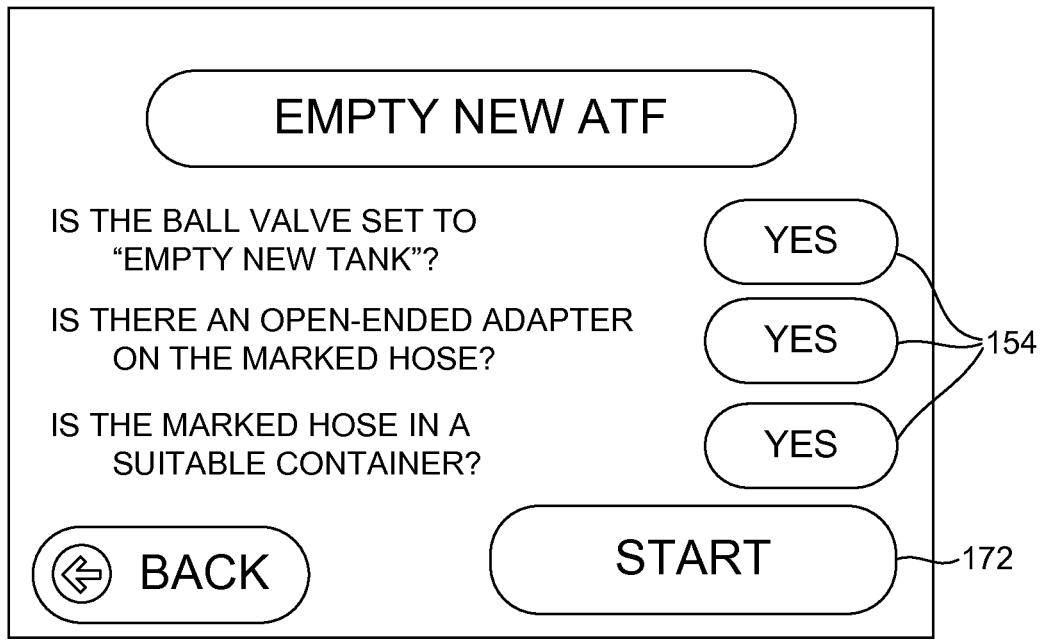
Figure 39:
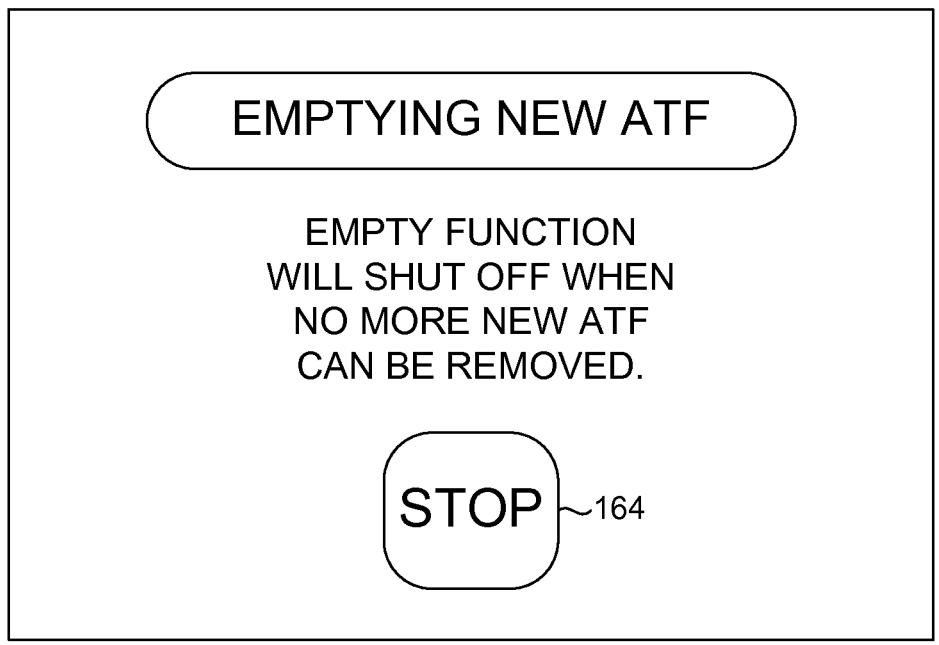
Figure 40:
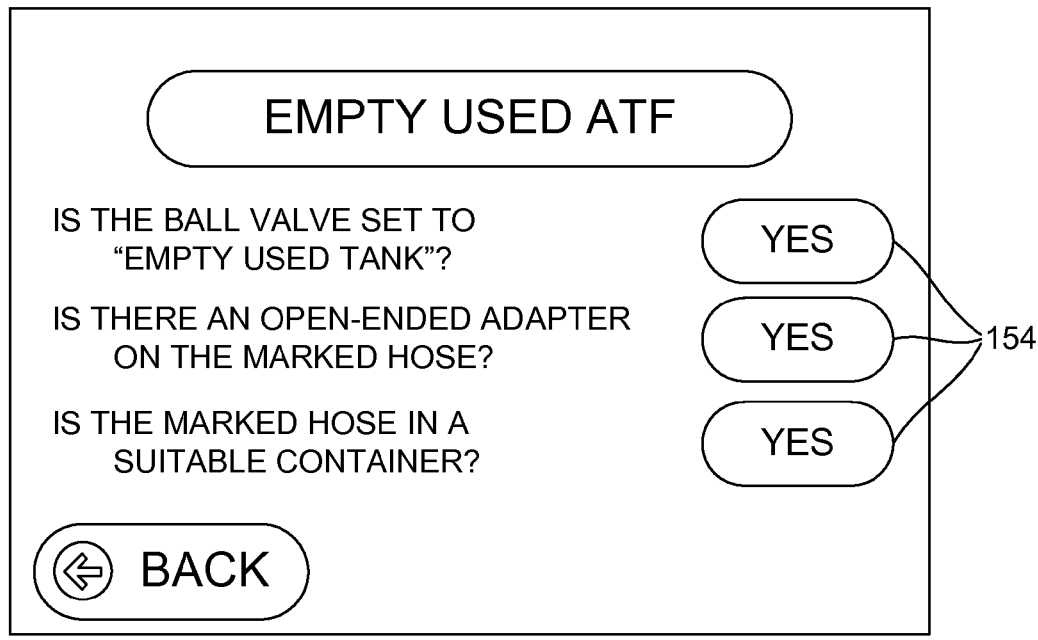
Figure 41:
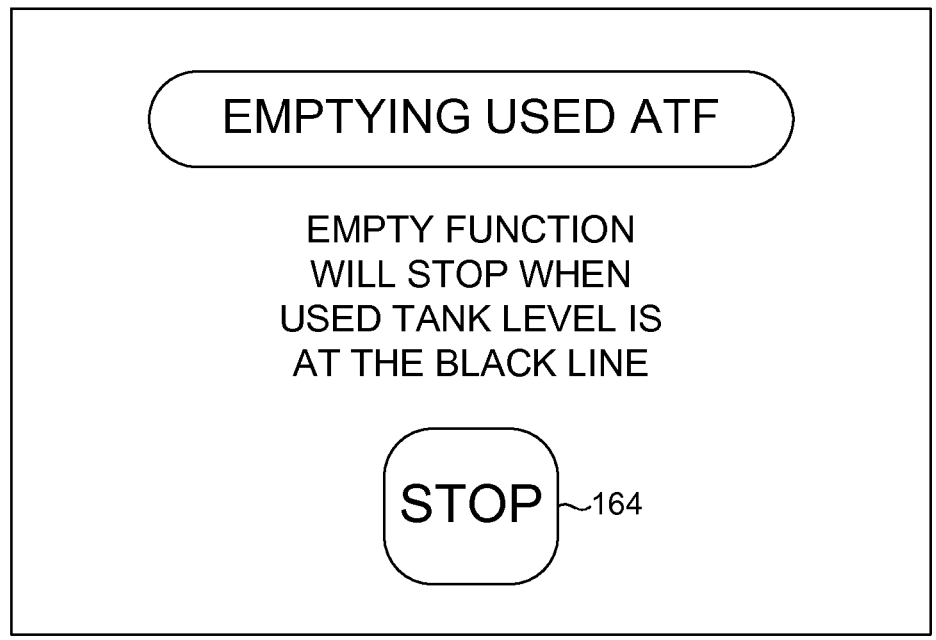

On the Home Screen, FIG. 16, pressing the "Empty New Tank" button 128 causes the display 24 to display an Empty New ATF screen, illustrated in FIG. 38. The screen displays a number of prompts that the user replies affirmatively to after completing any necessary tasks by pressing each of the "Yes" selection buttons 154. After all questions are answered in the affirmative, a "Start" button 172 appears. When pressed, the display 24 illustrates an Emptying New ATF screen, illustrated in FIG. 39, and the machine 10 begins emptying the New ATF tank 20 by activating the pump 48, in the manner discussed above. The emptying function will shut off when manually terminated by the user pressing the "Stop" button 164 or at a certain level. To keep the lines full, the machine preferably does not empty all the fluid out of either tank 18, 20, but leaves a small amount in the bottom of the tank 18, 20. That keeps the weight scales 60, 62 leveled out and it causes the machine 10 to never run dry. The hoses 40, 42 are preferably kept full all the time as well so they are ready to go and the user doesn't have to waste about ¾ths of a quart of ATF each time the machine 10 is used. Pressing the "Empty Used Tank" button 130 displays screens illustrated in FIGS. 40-41 and the machine 10 to remove the used ATF from the used fluid tank 18 as discussed above and in a process similar to that described in relation to FIGS. 38 and 39.

Figure 42:
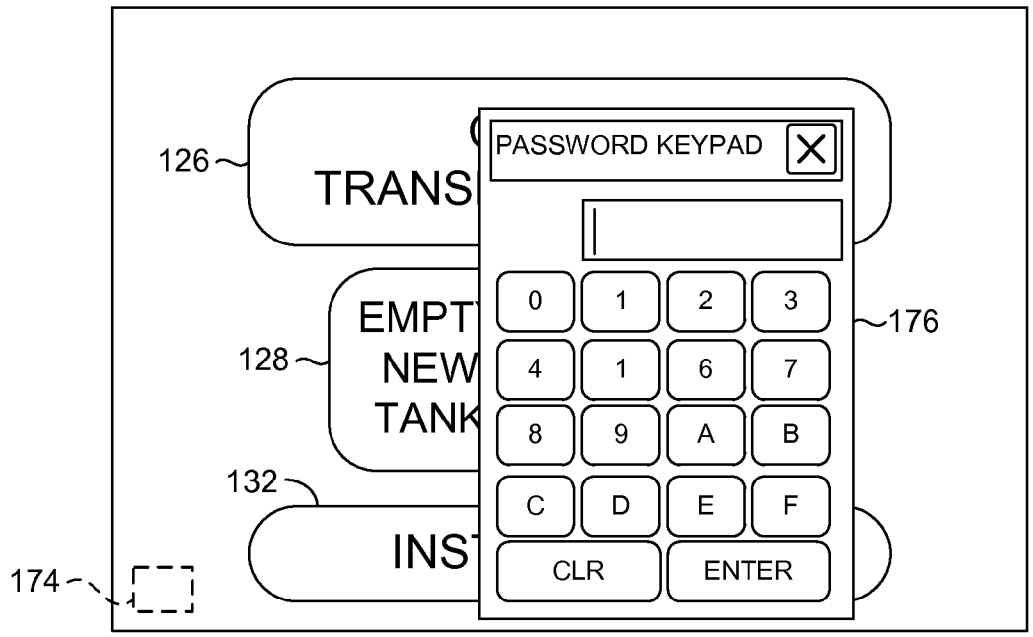
Figure 43:
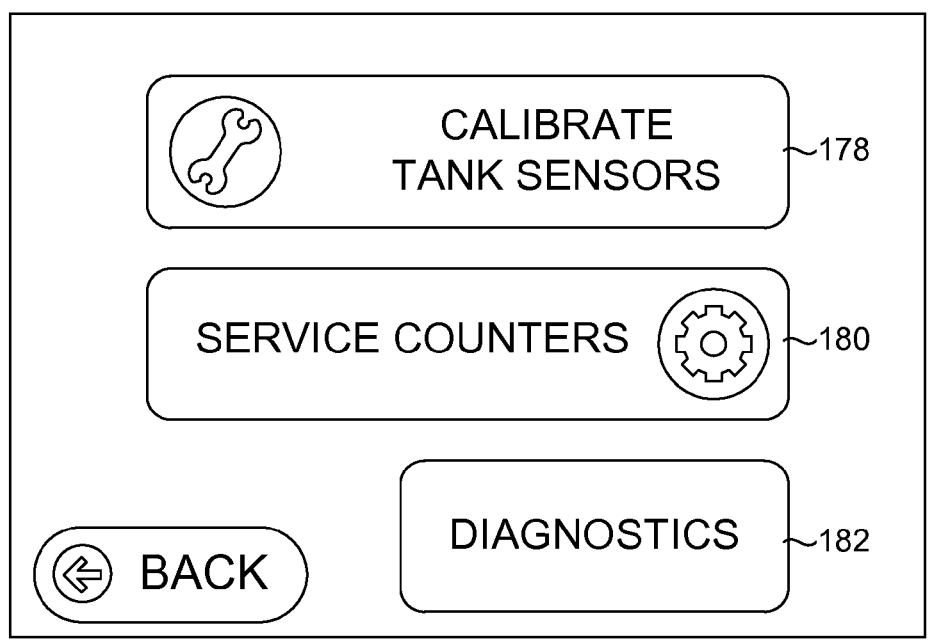

Returning to the Home Screen, illustrated in FIG. 16, a service the machine 10 option is available. An invisible button 174 is located on the Home Screen in the bottom left-hand corner. Pressing there brings up a Password Keypad 176, as shown in FIG. 42. After entering the password, the main service screen, illustrated in FIG. 43, appears. The service screen is mainly for distributor salesmen or a person that works on the machine 10. This provides for fixing the machine 10 if something's gone wrong and is not something service technicians need to have access to. Options on the service home screen are Calibrate Tank Sensors 178, Service Counters 180, and Diagnostics 182.

Figure 44:
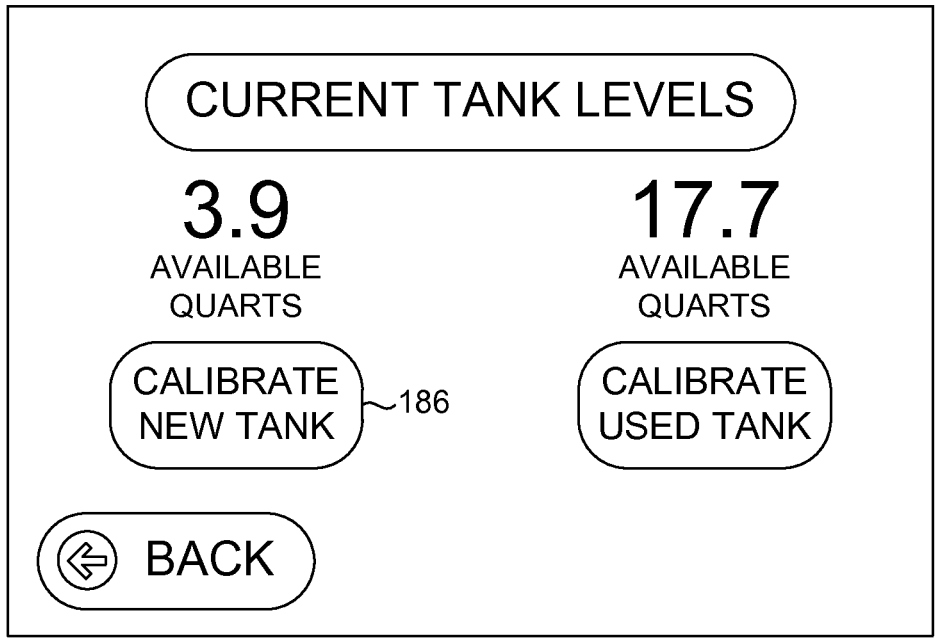
Figure 45:
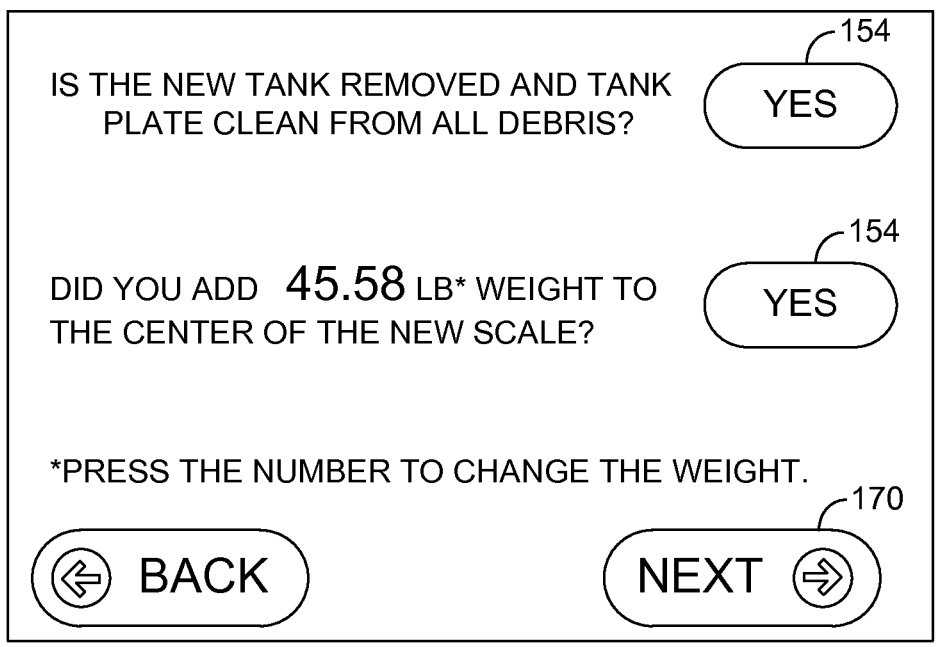

Pressing the Calibrate Tank Sensors button 178 displays a process screen, illustrated in FIG. 44, that allows the user to recalibrate the weight scales 60, 62 for the new tank 20 and/or the used tank 18, if needed. The display 24 shows the amount the machine 10 believes is present in each tank 18, 20. The user visually inspects the tanks 18, 20 and determines if the actual volume as measured by the scale markings 184 on the sides of the tanks 18, 20 match the digitally displayed amount. If the amounts do not correspond, the user can recalibrate the amounts. Pressing the Calibrate New Tank button 186 results in the display of a calibrate tank sensor screen, illustrated in FIG. 45.

Here, after cleaning the new fluid scale 60, a user puts a weight of a known amount on the new fluid scale 60. That amount is displayed as a number (e.g., 45.58 lbs.). If that amount is accurate, the user presses the "Yes" selection button 154. If it is not, the user presses the number (e.g., 45.58) and is allowed to move the value up or down to the correct amount, then presses the lower "Yes" selection button 154, at which time the scale 60 is recalibrated. Pressing the "Next" button 170 returns the user to the service home screen illustrated in FIG. 43.

Figure 46:
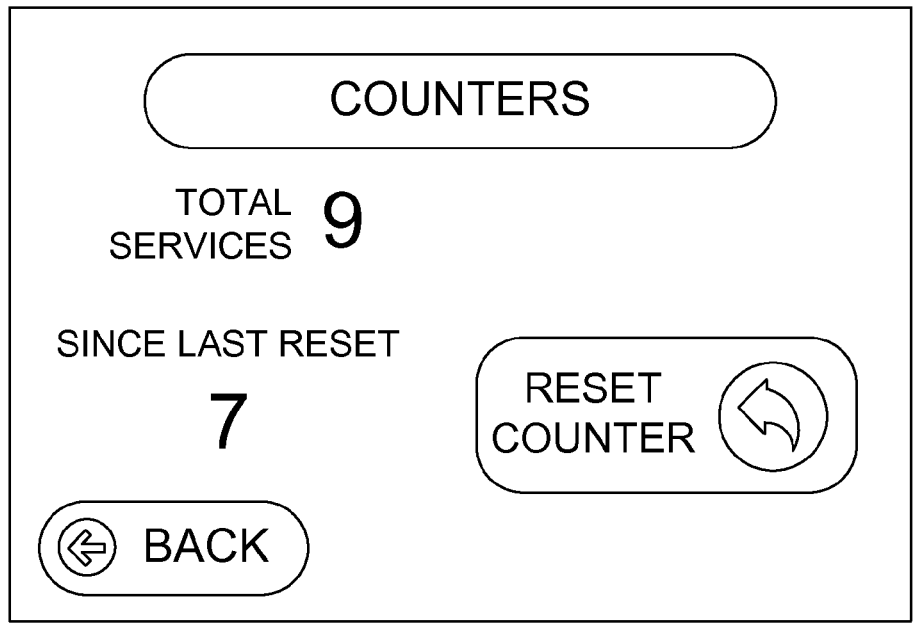

Pressing Service Counters button 180 displays a service counters screen, illustrated in FIG. 46. That screen informs the user how many total services have been performed by the machine 10 and how may since the counter was last reset by pressing the "Reset Counter" button 188.

Figure 47:
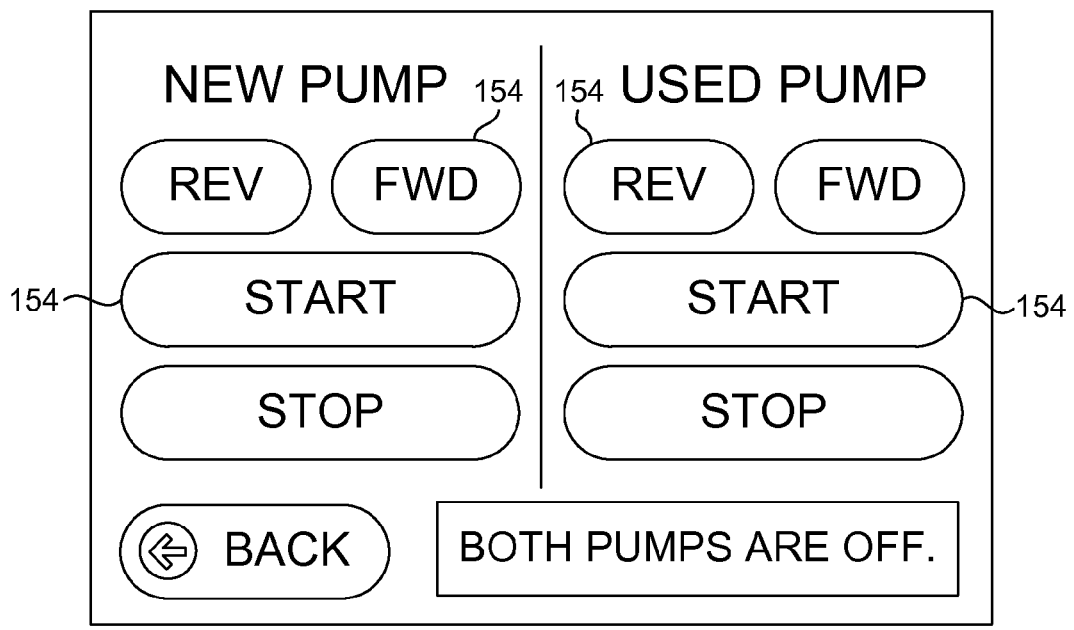

Pressing the Diagnostic button 182 on the service home screen (FIG. 43) displays a diagnostics screen, illustrated in FIG. 47. Here the user can manually run either pump 46, 48 in either direction to assure they are working properly by pressing the desired selection button 154.

The present invention has been described in relation to particular embodiments, which are intended in all respects to be illustrative rather than restrictive. Alternative embodiments will become apparent to those of ordinary skill in the art to which the present invention pertains without departing from its scope. Substitutions may be made and equivalents employed herein without departing from the scope of the invention as recited in the claims. It will be understood that certain features and subcombinations are of utility and may be employed without reference to other features and subcombinations. This is contemplated and within the scope of the claims.

What is claimed is:
1. A transmission fluid exchange machine comprising:
a frame having a housing;
a display coupled with the housing;
a new fluid manifold and a used fluid manifold, both manifolds coupled with the housing and in fluid communication with each other;

a new fluid pump and a used fluid pump, the new fluid pump coupled with the new fluid manifold and the used fluid pump coupled with the used fluid manifold; and a processor coupled with the display for displaying images thereon and selectively controlling activation of the pumps, wherein the used fluid manifold includes a solenoid valve selectively controllable by the processor to direct the flow of fluid through the used fluid manifold, wherein the used fluid manifold includes at least three ports, wherein one of the ports is coupled with the used fluid pump, and wherein one of the ports is coupled with the new fluid manifold.

2. The machine of claim 1, wherein the new fluid manifold has a plurality of pathways therethrough, wherein the pathways include a plurality of balls therein for controlling the direction of flow of fluid through the pathways, and wherein a direction of rotation of the new fluid pump determines positioning of at least one of the balls.

3. The machine of claim 1, further comprising:
a used fluid tank for holding used transmission fluid, the used fluid tank supported by the frame, wherein the used fluid pump is in communication with the used fluid tank and is operable to selectively withdraw fluid from the used fluid tank and dispense fluid into the used fluid tank; and
a new fluid tank for holding new transmission fluid, the new fluid tank supported by the frame, wherein the new fluid pump is in communication with the new fluid tank and is operable to selectively withdraw fluid from the new fluid tank and dispense fluid into the new fluid tank.

4. The machine of claim 3, further comprising:
a pair of service hoses extending from the machine, wherein the hoses are in fluid communication with the manifolds, and wherein the hoses have distal ends for coupling with a transmission system of a vehicle, whereby transmission fluid in the transmission system may flow through the machine when the machine is coupled with the transmission system via the service hoses.

5. The machine of claim 4, further comprising:
a ball valve intermediate and in fluid communication with one of the service hoses and one of the manifolds; and
a sight glass in fluid communication with the ball valve, wherein the sight glass includes a transparent portion having a fluid passage with a bullet therein biased in one direction by a spring, wherein fluid flowing into the passage in a first direction moves the bullet against the bias of the spring, thereby providing a visual indicator that fluid is flowing through the sight glass in a desired direction, wherein fluid flowing into the passage in a second direction opposite the first direction does not move the bullet against the bias of the spring, thereby providing a visual indicator that fluid is not flowing in the desired direction, and wherein the ball valve is selectively operable to alternate the direction of a flow of the fluid through the passage of the sight glass.

6. The machine of claim 1, further comprising:
a first funnel in fluid communication with at least one of the manifolds, wherein the funnel provides an opening in the housing, and wherein fluids poured therein are selectively permitted to mix with fluid in the machine during operation.

7. The machine of claim 6, wherein the new fluid manifold is intermediate and in fluid communication with the first fluid funnel and the new fluid pump, wherein activation of the pump in a first direction withdraws fluid out of the funnel, through the new fluid manifold, and through the new fluid pump.

8. The machine of claim 2, wherein the new fluid manifold includes at least six ports, wherein two of the ports are coupled with the new fluid pump, wherein one of the ports is coupled with the used fluid manifold, wherein one of the ports is coupled with a new fluid tank, wherein one of the ports is coupled with a first funnel, and wherein one of the ports is coupled with one of a ball valve and a sight glass.

9. The machine of claim 8, wherein the new fluid manifold includes at least a seventh port coupled with a pressure gauge and wherein the pressure gauge displays fluid pressure in the machine as a fluid passes through the new fluid manifold.

10. The machine of claim 3, further comprising:
a used fluid scale positioned under the used fluid tank for determining the weight of any used fluid in the used fluid tank; and
a new fluid scale positioned under the new fluid tank for determining the weight of any new fluid in the new fluid tank;
wherein the processor, during an exchange process, uses the used fluid scale to repeatedly calculate the amount of used fluid being added to the used fluid tank and controls the new fluid pump to ensure that an equal amount of new fluid is being withdrawn from the new fluid tank by using the new fluid scale to repeatedly calculate the amount of new fluid being removed from the new fluid tank.

11. A transmission fluid exchange machine for exchanging used transmission fluid in a transmission of a vehicle with new transmission fluid, the machine comprising;
a frame having a housing;
electrical components generally positioned within the housing, the electrical components including:
a display mounted on the housing;
a processor coupled with the display for displaying images thereon for controlling operation of the machine;
a new fluid motor and a used fluid motor, both in electrical communication with and controlled by the processor; and
a new fluid scale and a used fluid scale, both in electrical communication with and controlled by the processor; and
plumbing components supported by the frame, the plumbing components including:
a new fluid tank for holding new transmission fluid and a used fluid tank for holding used transmission fluid;
a new fluid manifold in fluid communication with the new fluid tank and a used fluid manifold in fluid communication with the used fluid tank, both manifolds in fluid communication with each other; and
a new fluid pump and a used fluid pump, the new fluid pump coupled with the new fluid manifold and operated by the new fluid motor, and the used fluid pump coupled with the used fluid manifold and operated by the used fluid motor;
wherein the used fluid scale is positioned under the used fluid tank for determining the weight of any used fluid in the used fluid tank, wherein the new fluid scale is positioned under the new fluid tank for determining the weight of any new fluid in the new fluid tank, and wherein the processor, during an exchange process, uses the used fluid scale to repeatedly calculate the amount of used fluid being added to the used fluid tank and controls the new fluid motor and pump to ensure that an equal amount of new fluid is being withdrawn from the new fluid tank by using the new fluid scale to repeatedly calculate the amount of new fluid being removed from the new fluid tank.

12. The machine of claim 11, wherein the new fluid manifold has a plurality of pathways therethrough, wherein the pathways include a plurality of balls therein for controlling the direction of flow of fluid through the pathways, and wherein a direction of rotation of the new fluid pump determines positioning of at least one of the balls.

13. The machine of claim 11, wherein the electrical components further include a solenoid valve coupled with the used fluid manifold and wherein the solenoid valve is selectively operable by the processor to control the flow of fluid through the used fluid manifold.

14. The machine of claim 11, wherein both the new fluid motor and the used fluid motor are reversible, whereby each pump can withdraw fluid from or deposit fluid in its associated tank.

15. The machine of claim 11, further comprising:
- a pair of service hoses extending from the machine, wherein the hoses are in fluid communication with the manifolds, and wherein the hoses have distal ends for coupling with the transmission of the vehicle, whereby transmission fluid in the transmission system may flow through the machine when the machine is coupled with the transmission via the service hoses;
- a ball valve intermediate and in fluid communication with one of the service hoses and one of the manifolds; and
- a sight glass in fluid communication with the ball valve, wherein the sight glass includes a transparent portion having a fluid passage with a bullet therein biased in one direction by a spring, wherein fluid flowing into the passage in a first direction moves the bullet against the bias of the spring, thereby providing a visual indicator that fluid is flowing through the sight glass in a desired direction, wherein fluid flowing into the passage in a second direction opposite the first direction does not move the bullet against the bias of the spring, thereby providing a visual indicator that fluid is not flowing through the sight glass in the desired direction, and wherein the ball valve is selectively operable to alternate the direction of a flow of the fluid through the passage of the sight glass.

16. A method of performing a transmission fluid exchange service on a vehicle using a transmission fluid exchange machine having a display, the method comprising:
- displaying on the display a transmission fluid level adjustment screen;
- receiving an indication of an amount to adjust the fluid level of the vehicle;
- displaying on the display an exchange amount of fluid screen;
- receiving an indication of an transmission fluid to exchange;
- displaying on the display a chemical additions screen;
- receiving an indication of whether chemicals are to be added to new fluid; and
- displaying on the display an indication of an amount of used fluid removed and an amount of new fluid added.

17. The method of claim 16, further comprising:
- displaying on the display an amount of time to run any chemicals added to the vehicle's transmission system; and
- receiving an indication of a duration to run the chemicals through the vehicle's system.

18. The method of claim 16, further comprising:
- receiving a first reading indicating a weight of an amount of used fluid in a used fluid tank of the machine,
- calculating a volume of used fluid in the used fluid tank based on the first reading;
- receiving a second reading indicating a weight of an amount of new fluid in a new fluid tank of the machine,
- calculating a volume of new fluid in the new fluid tank based on the second reading;
- comparing the volume of used fluid in the used fluid tank with the volume of new fluid in the new fluid tank; and
- operating one of a new fluid pump and a used fluid pump to ensure that a volume of fluid put into the used fluid tank is a volume of fluid removed from the new fluid tank.

19. A transmission fluid exchange machine comprising:
- a frame having a housing;
- a display coupled with the housing;
- a new fluid manifold and a used fluid manifold, both manifolds coupled with the housing and in fluid communication with each other;
- a new fluid pump and a used fluid pump, the new fluid pump coupled with the new fluid manifold and the used fluid pump coupled with the used fluid manifold; and
- a processor coupled with the display for displaying images thereon and selectively controlling activation of the pumps, wherein the new fluid manifold has a plurality of pathways therethrough,
- wherein the pathways include a plurality of balls therein for controlling the direction of flow of fluid through the pathways, and wherein a direction of rotation of the new fluid pump determines positioning of at least one of the balls,
- wherein the new fluid manifold includes at least four ports, wherein two of the ports are coupled with the new fluid pump, and wherein one of the ports is coupled with the used fluid manifold.

* * * * *